(12) United States Patent
Shen

(10) Patent No.: US 10,785,393 B2
(45) Date of Patent: Sep. 22, 2020

(54) METHODS AND DEVICES FOR SELECTIVE FLASH ILLUMINATION

(71) Applicant: Facebook, Inc., Menlo Park, CA (US)

(72) Inventor: Shizhe Shen, San Mateo, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 14/720,390

(22) Filed: May 22, 2015

(65) Prior Publication Data

US 2016/0344910 A1  Nov. 24, 2016

(51) Int. Cl.
| | |
|---|---|
| H04N 5/222 | (2006.01) |
| H04N 5/225 | (2006.01) |
| H04N 5/232 | (2006.01) |
| G06T 7/50 | (2017.01) |
| H04N 5/235 | (2006.01) |
| G06K 9/20 | (2006.01) |
| G06K 9/32 | (2006.01) |
| G06K 9/00 | (2006.01) |

(52) U.S. Cl.
CPC ....... *H04N 5/2256* (2013.01); *G06K 9/00201* (2013.01); *G06K 9/2027* (2013.01); *G06K 9/3241* (2013.01); *G06T 7/50* (2017.01); *H04N 5/2354* (2013.01); *H04N 5/23216* (2013.01); *H04N 5/23241* (2013.01); *G06K 2209/401* (2013.01)

(58) Field of Classification Search
CPC .. H04N 5/2354; H04N 5/2256; H04N 5/2351; H04N 9/735; H04N 9/317; G03B 15/05; G01S 17/89; G01N 21/8806; G02B 7/36; G02B 7/32; G01B 11/2513; G01B 11/25; G01B 11/22; G06T 7/521; G06T 7/50; G06K 2209/401; G06K 9/00201
See application file for complete search history.

(56) References Cited

U.S. PATENT DOCUMENTS

| | | | | |
|---|---|---|---|---|
| 7,920,205 B2 * | 4/2011 | Awazu | ............ | G03B 7/16 |
| | | | | 348/371 |
| 8,761,594 B1 * | 6/2014 | Gross | ............ | H04N 5/2256 |
| | | | | 396/155 |
| 8,860,843 B2 * | 10/2014 | Mate | ............ | H04N 5/2256 |
| | | | | 348/224.1 |

(Continued)

OTHER PUBLICATIONS

Shen, Office Action, U.S. Appl. No. 14/703,649, dated Dec. 1, 2017, 13 pgs.

(Continued)

*Primary Examiner* — Sinh Tran
*Assistant Examiner* — Selam T Gebriel
(74) *Attorney, Agent, or Firm* — Morgan, Lewis & Bockius LLP

(57) ABSTRACT

The various embodiments described herein include methods and/or devices for directing flash illumination. In one aspect, a method is performed at a device including a camera, one or more processors, and memory storing one or more programs configured for execution by the one or more processors. The method includes directing flash illumination to an identified area of interest in a scene by adjusting power supplied to respective elements of a flash array. The method further includes capturing, via the camera, an image of the scene as illuminated by the flash illumination.

17 Claims, 21 Drawing Sheets

(56) References Cited

U.S. PATENT DOCUMENTS

| | | | |
|---|---|---|---|
| 9,237,275 B2* | 1/2016 | Spielberg | H04N 5/2354 |
| 2002/0191102 A1* | 12/2002 | Yuyama | H04N 5/2256 |
| | | | 348/370 |
| 2005/0046739 A1* | 3/2005 | Voss | H04N 5/3572 |
| | | | 348/371 |
| 2008/0218618 A1* | 9/2008 | Pfeffer | H04N 5/2256 |
| | | | 348/294 |
| 2008/0240502 A1* | 10/2008 | Freedman | G01B 11/2513 |
| | | | 382/103 |
| 2009/0008530 A1* | 1/2009 | Wernersson | G03B 15/02 |
| | | | 250/201.2 |
| 2011/0188054 A1 | 8/2011 | Petronius et al. | |
| 2012/0056982 A1 | 3/2012 | Katz et al. | |
| 2012/0249743 A1 | 10/2012 | Kim et al. | |
| 2012/0327218 A1 | 12/2012 | Baker et al. | |
| 2013/0038881 A1 | 2/2013 | Pesach et al. | |
| 2013/0064531 A1* | 3/2013 | Pillman | H04N 5/23296 |
| | | | 396/62 |
| 2013/0136307 A1 | 5/2013 | Yu et al. | |
| 2013/0293679 A1* | 11/2013 | Gurman | G06K 9/00362 |
| | | | 348/46 |
| 2014/0021259 A1* | 1/2014 | Moed | G06K 9/2027 |
| | | | 235/472.01 |
| 2014/0049609 A1* | 2/2014 | Wilson | G01S 17/89 |
| | | | 348/46 |
| 2014/0307102 A1 | 10/2014 | Chang et al. | |
| 2015/0022697 A1 | 1/2015 | Appia et al. | |
| 2015/0030256 A1* | 1/2015 | Brady | H01Q 3/24 |
| | | | 382/254 |
| 2015/0092016 A1* | 4/2015 | Chen | G01B 11/25 |
| | | | 348/46 |
| 2015/0187082 A1* | 7/2015 | Bernal | G06T 7/0075 |
| | | | 382/154 |
| 2015/0248775 A1* | 9/2015 | Freeman | G06T 7/0081 |
| | | | 345/589 |
| 2016/0150219 A1 | 5/2016 | Gordon et al. | |
| 2016/0253809 A1 | 9/2016 | Cole et al. | |
| 2016/0253812 A1* | 9/2016 | Grossinger | G01B 11/14 |
| | | | 356/614 |
| 2016/0309068 A1 | 10/2016 | Nadeau et al. | |

OTHER PUBLICATIONS

Shen, Notice of Allowance, U.S. Appl. No. 14/703,649, May 8, 2018, 13 pgs.

Shen, Office Action, U.S. Appl. No. 16/052,491, Feb. 14, 2019, 17 pgs.

Shen, Final Office Action, U.S. Appl. No. 16/052,491, Dec. 12, 2019, 20 pgs.

Shen, Office Action, U.S. Appl. No. 16/052,491, Apr. 17, 2020, 21 pgs.

* cited by examiner

METHODS AND DEVICES FOR SELECTIVE FLASH ILLUMINATION

TECHNICAL FIELD

The disclosed embodiments relate generally to flash techniques, including but not limited to directing flash illumination utilizing a flash array.

BACKGROUND

Many devices currently employ a flash to help illuminate a scene for capture by a camera or other optical sensor. However, there is an ongoing challenge to use precise and efficient flash devices. Conventional methods for flash generation are imprecise and/or inefficient. For example, many conventional flash devices direct illumination toward the center of a scene, regardless of whether the main image target is at that location. In addition, many flash devices consume power to direct illumination toward parts of the scene that are too distant from the device to be properly illuminated by the flash illumination.

SUMMARY

Accordingly, there is a need for devices with more precise and/or efficient methods for flash illumination. Such methods and devices optionally complement or replace conventional flash illumination methods and devices.

In one aspect, some embodiments include a method performed at a device including a camera, one or more processors, and memory storing one or more programs configured for execution by the one or more processors. The method includes directing flash illumination to an identified area of interest in a scene by adjusting power supplied to respective elements of a flash array. The method further includes capturing, via the camera, an image of the scene as illuminated by the flash illumination.

In another aspect, some embodiments include a device (e.g., a mobile device) with a flash array including a plurality of light sources, and a controller to adjust power supplied to respective light sources of the plurality of light sources. The device is configured to perform the method described above.

In yet another aspect, some embodiments include a non-transitory computer-readable storage medium that has stored therein instructions that, when executed by a device, cause the device to perform the operations of the method described above. In still another aspect, some embodiments include a device with one or more processors; memory storing one or more programs configured to be executed by the one or more processors; and means for performing the method described above.

Thus, devices are provided with more precise/efficient methods for flash illumination, thereby increasing the accuracy, precision, efficiency, and user satisfaction with such devices. Such methods may complement or replace conventional methods for flash illumination.

BRIEF DESCRIPTION OF THE DRAWINGS

For a better understanding of the various described embodiments, reference should be made to the Description of Embodiments below, in conjunction with the following drawings. The appended drawings, however, merely illustrate the more pertinent features of the present disclosure and are therefore not to be considered limiting, for the description may admit to other effective features. Like reference numerals refer to corresponding parts throughout the figures and description.

Figure 1A:
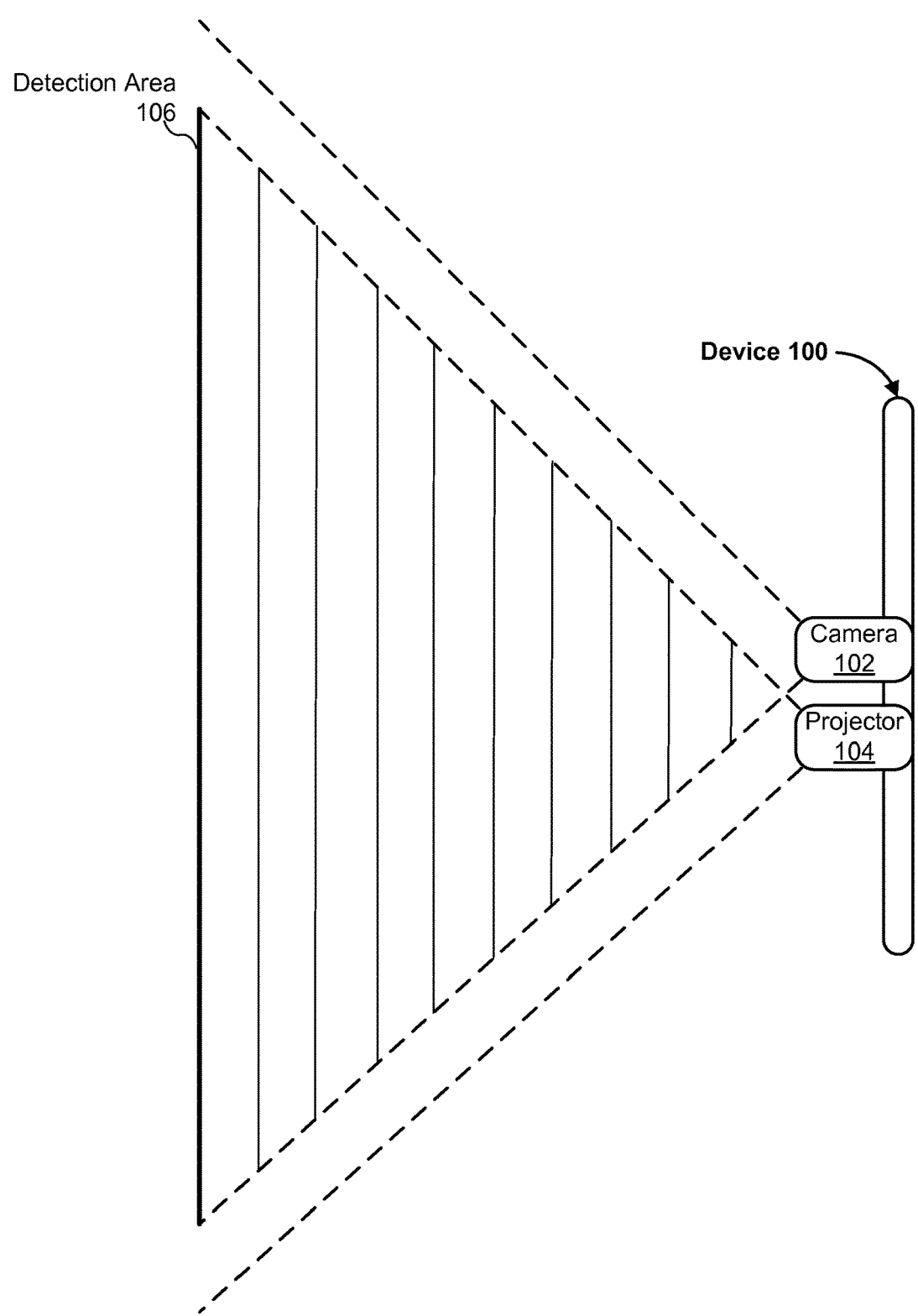
FIG. 1A is a diagram illustrating an exemplary implementation of a depth mapping device, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of an apparatus, device, or medium.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In some instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first area of interest could be termed a second area of interest, and, similarly, a second area of interest could be termed a first area of interest, without departing from the scope of the various described embodiments. The first area of interest and the second area of interest are both areas of interest, but they are not the same area of interest.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context. In addition, the term "exemplary" is used in the sense of "serving as an example, instance, or illustration" and not in the sense of "representing the best of its kind."

Embodiments of apparatuses and associated processes for using such apparatuses are described. In some embodiments, the apparatus is a portable electronic device (e.g., communications device), such as a mobile telephone or personal digital assistant (PDA), that also contains other functions, such as camera functions. Other portable electronic devices, such as laptops or tablet computers are optionally used. It should also be understood that, in some embodiments, the apparatus is not a portable communications device, but is another type of device, such as a desktop computer, or an apparatus including a network of components.

FIG. 1A is a diagram illustrating an exemplary implementation of depth mapping device 100 (sometimes called "device 100"), in accordance with some embodiments. Device 100 includes camera 102 and projector 104. FIG. 1A also shows detection area 106 for device 100. Detection area 106 is the area in which the field of view of camera 102 and the field of projection of projector 104 overlap. In some instances, the horizontal range of detection area 106 is limited by the range of projector 104. In some instances, the horizontal range of detection area 106 is limited by the light-capturing capabilities of camera 102. Device 100 optionally includes one or more additional components such as a display, a user interface, and a flash. In some embodiments, device 100 is a mobile device such as a mobile telephone or a tablet computer. In some embodiments, device 100 is a stationary device such as a desktop computer or a computer system.

Camera 102 (also sometimes called an "optical sensor") captures light from the environment, projected through one or more lenses, and converts the light to data representing an image. In conjunction with an imaging module (e.g., imaging module 234, FIG. 2), camera 102 captures still images and/or video. Camera 102 optionally includes charge-coupled device (CCD) or complementary metal-oxide semiconductor (CMOS) phototransistors. In some embodiments, camera 102 is capable of capturing infrared light and/or near infrared light. In some embodiments, camera 102 is capable of capturing visible and infrared light.

In conjunction with a projection module (e.g., projection module 230, FIG. 2), projector 104 projects light (e.g., structured light). In some embodiments, projector 104 is a pico projector (also sometimes called a "pocket projector", "mobile projector", or "mini beamer"). In some embodiments, projector 104 is capable of projecting infrared light and/or near infrared light. In some embodiments, projector 104 includes one or more lasers. In some embodiments, projector 104 includes one or more light-emitting diodes (LEDs). In some embodiments, projector 104 includes one or more organic light-emitting diodes (OLEDs). In some embodiments, projector 104 includes one or more liquid-crystal-on-silicon (LCoS) devices.

Figure 1B:
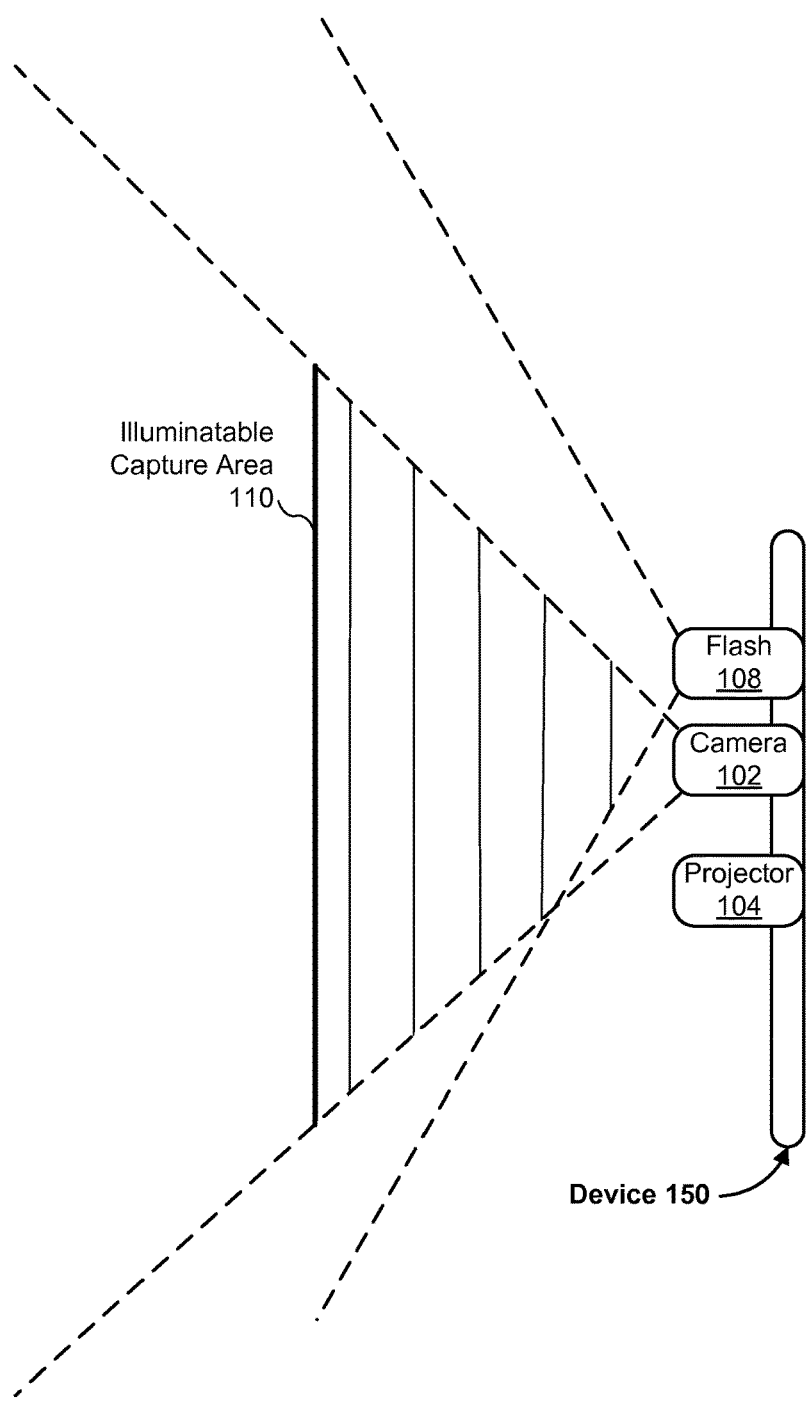
FIG. 1B is a diagram illustrating an exemplary implementation of a flash optimization device, in accordance with some embodiments.
Figure 7A:
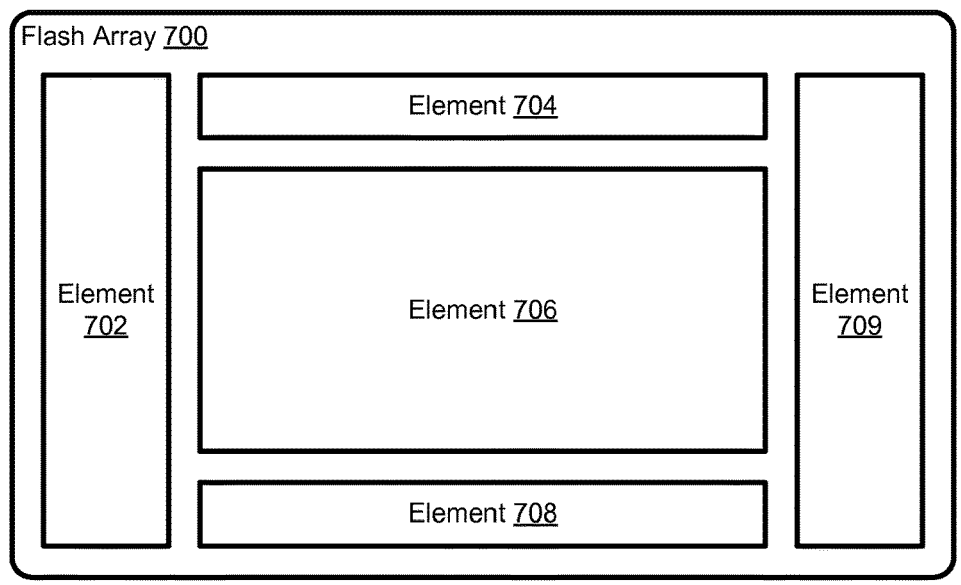
FIGS. 7A-7D are diagrams illustrating exemplary implementations of a flash array.
Figure 7B:
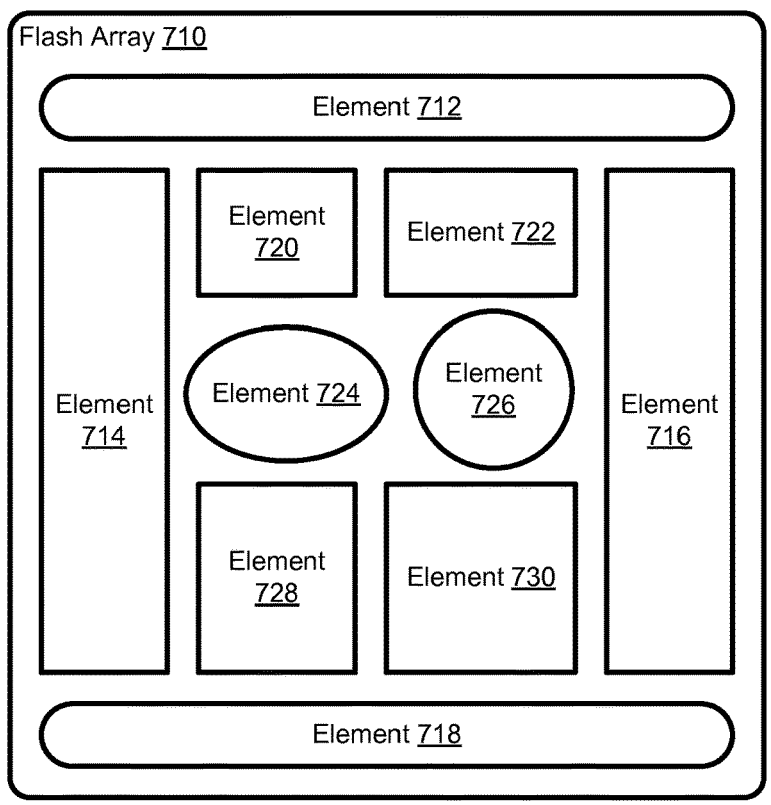
Figure 7C:
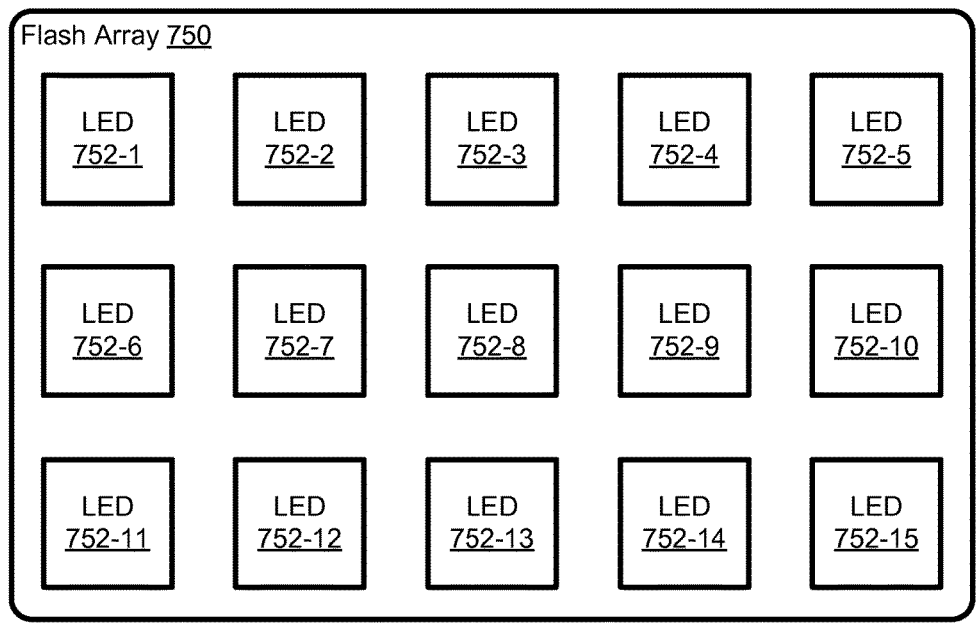

FIG. 1B is a diagram illustrating an exemplary implementation of depth mapping and flash illumination device 150 (sometimes called "device 150"), in accordance with some embodiments. In some embodiments, device 150 includes device 100. Device 150 includes flash 108 as well as camera 102 and projector 104. Alternatively, a device may be used for flash illumination but not depth mapping, and thus may include flash 108 and camera 102 but not projector 104. FIG. 1B also shows illuminated capture area 110 for device 150. Illuminated capture area 110 is the area of overlap for the field of view of camera 102 and the field of illumination (i.e., the area that can be illuminated) for flash 108. In some embodiments, projector 104 includes flash 108. In some embodiments, the light-producing elements of projector 104 are used to illuminate the scene In conjunction with a flash module (e.g., flash module 248, FIG. 2), flash 108 produces directed light to help illuminate a scene (e.g., for capture by camera 102). In some embodiments, flash 108 is operated in conjunction with camera 102 to illuminate areas of interest in a scene for capture by camera 102. In some embodiments, flash 108 provides a burst of directed light (e.g., for use in capturing still images) while in other embodiments flash 108 provides continuously directed light (e.g., for use in capturing video images). As will be discussed further with reference to FIGS. 7A-7D, in some embodiments, flash 108 includes an array of flash elements (e.g., as shown in FIGS. 7A-7C) such as an array of LED elements (e.g., as shown in FIG. 7C).

Figure 2:
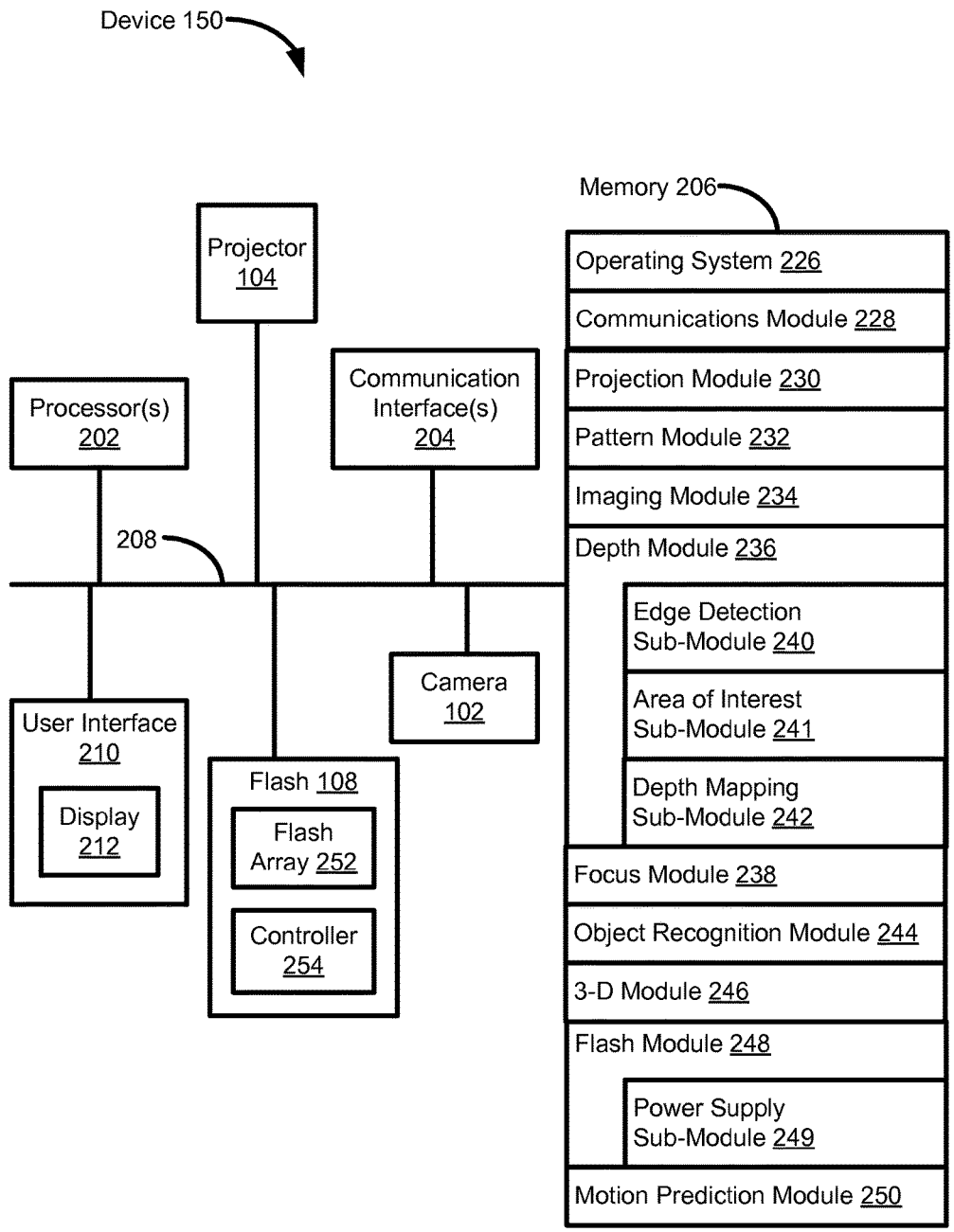
FIG. 2 is a block diagram illustrating an exemplary implementation of the flash optimization device, in accordance with some embodiments.

FIG. 2 is a block diagram illustrating an exemplary implementation of device 150, in accordance with some embodiments. Device 150, in the example of FIG. 2, includes one or more processing units (processors or cores) 202, one or more network or other communications interfaces 204, memory 206, and one or more communication buses 208 for interconnecting these components. Communication buses 208 optionally include circuitry (sometimes called a chipset) that interconnects and controls communications between system components. Device 150 also includes a user interface 210. User interface 210 includes display 212. Device 150 further includes camera 102, projector 104, and flash 108. In some embodiments, projector 104 is a separate and distinct device from device 150. The user interface 210, projector 104, camera 102, and flash 108 thus may also connect to the one or more communication buses 208. In some embodiments, the flash 108 includes a flash array 252 that includes a plurality of light sources and a controller 254 (e.g., a processor, such as a microcontroller) that adjusts power supplied to respective light sources of the plurality of light sources. The controller may alternatively be separate from the flash 108 (e.g., may be one of the one or more processors 202).

In some embodiments, the device 150 includes inputs such as a keyboard, mouse, and/or other input buttons. Alternatively, or in addition, in some embodiments, display 212 includes a touch-sensitive surface, in which case display 212 is a touch-sensitive display. In devices that have a touch-sensitive display, a physical keyboard is optional (e.g., a soft keyboard may be displayed when keyboard entry is needed). User interface 210 optionally also includes an audio output device, such as speakers or an audio output connection connected to speakers, earphones, or headphones. Furthermore, some devices 150 use a microphone and voice recognition to supplement or replace the keyboard. Optionally, device 150 includes an audio input device (e.g., a microphone) to capture audio (e.g., speech from a user). Optionally, device 150 includes a location detection component, such as a GPS (global positioning satellite) or other geo-location receiver, for determining the location of device 150.

Memory 206 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 206 optionally includes one or more storage devices remotely located from processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules, and data structures, or a subset or superset thereof:

- operating system 226 that includes procedures for handling various basic system services and for performing hardware dependent tasks;
- network communication module 228 for connecting device 150 to other devices via communication network interface(s) 204 (wired or wireless) and one or more communication networks, such as the Internet, cellular telephone networks, mobile data networks, other wide area networks, local area networks, metropolitan area networks, and so on;
- projection module 230 for projecting light (e.g., structured-light) in conjunction with projector 104;
- pattern module 232 for obtaining (e.g., receiving or generating) structured-light patterns for use with projector 104;
- imaging module 234 for capturing still and/or video images of a scene in conjunction with camera 102;
- depth module 236 for generating and analyzing depth maps, including the following sub-modules, or a subset or superset thereof:
  - edge detection sub-module 240 for detecting depth disrupting edges (e.g., object edges) in the scene;
  - area of interest sub-module 241 for identifying areas of interest in the scene; and
  - depth mapping sub-module 242 for generating depth maps of the scene or portions thereof;
- focus module 238 for focusing camera 102;
- object recognition module 244 for identifying objects in a scene;
- 3-D module 246 for recognizing 3-D gestures that utilize device 150;
- flash module 248 for producing directed light in conjunction with flash 108, including power supply sub-module 249 for supplying power to flash 108; and
- motion prediction module 250 for predicting movement of an identified object in a scene.

Each of the above identified modules and applications correspond to a set of executable instructions for performing one or more functions as described above and/or in the methods described herein (e.g., the computer-implemented methods and other information processing methods described herein). These modules (i.e., sets of instructions) need not be implemented as separate software programs, procedures, or modules, and thus various subsets of these modules are, optionally, combined or otherwise re-arranged in various embodiments. In some embodiments, memory 206 stores a subset of the modules and data structures identified above. Furthermore, memory 206 optionally stores additional modules and data structures not described above. For example, in some embodiments, area of interest sub-module 241 is separate from depth module 236. In some embodiments, focus module 238 includes an area of interest sub-module for identifying areas of interest in a scene for use with flash 108. In some embodiments, power supply sub-module 249 is separate from flash module 248.

In some embodiments, memory 206 also includes one or more application modules. Examples of application modules that are, optionally, stored in memory 206 include word processing applications, image editing applications, drawing applications, presentation applications, browser applications, JAVA-enabled applications, encryption, digital rights management, voice recognition, and voice replication.

Although FIG. 2 shows an example of device 150, FIG. 2 is intended more as a functional description of the various features which may be present in a device than as a structural schematic of the embodiments described herein. In practice, and as recognized by those of ordinary skill in the art, items shown separately could be combined and some items could be separated.

Attention is now directed to depth mapping, embodiments of which are described with respect to FIGS. 3A-6B.

Figure 3A:
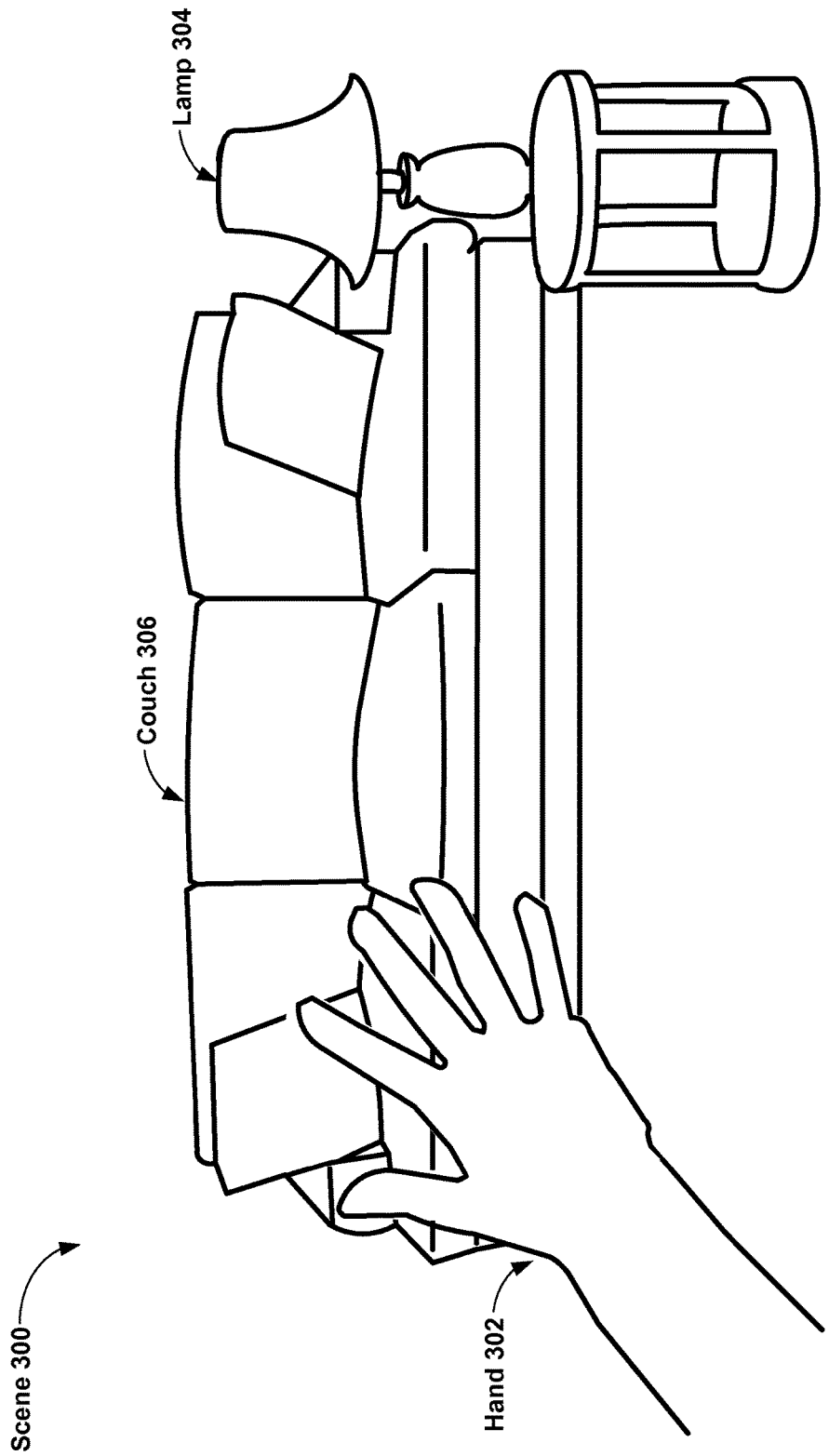
FIGS. 3A-3B illustrate exemplary procedures for projecting structured light on a scene, in accordance with some embodiments.
Figure 3B:
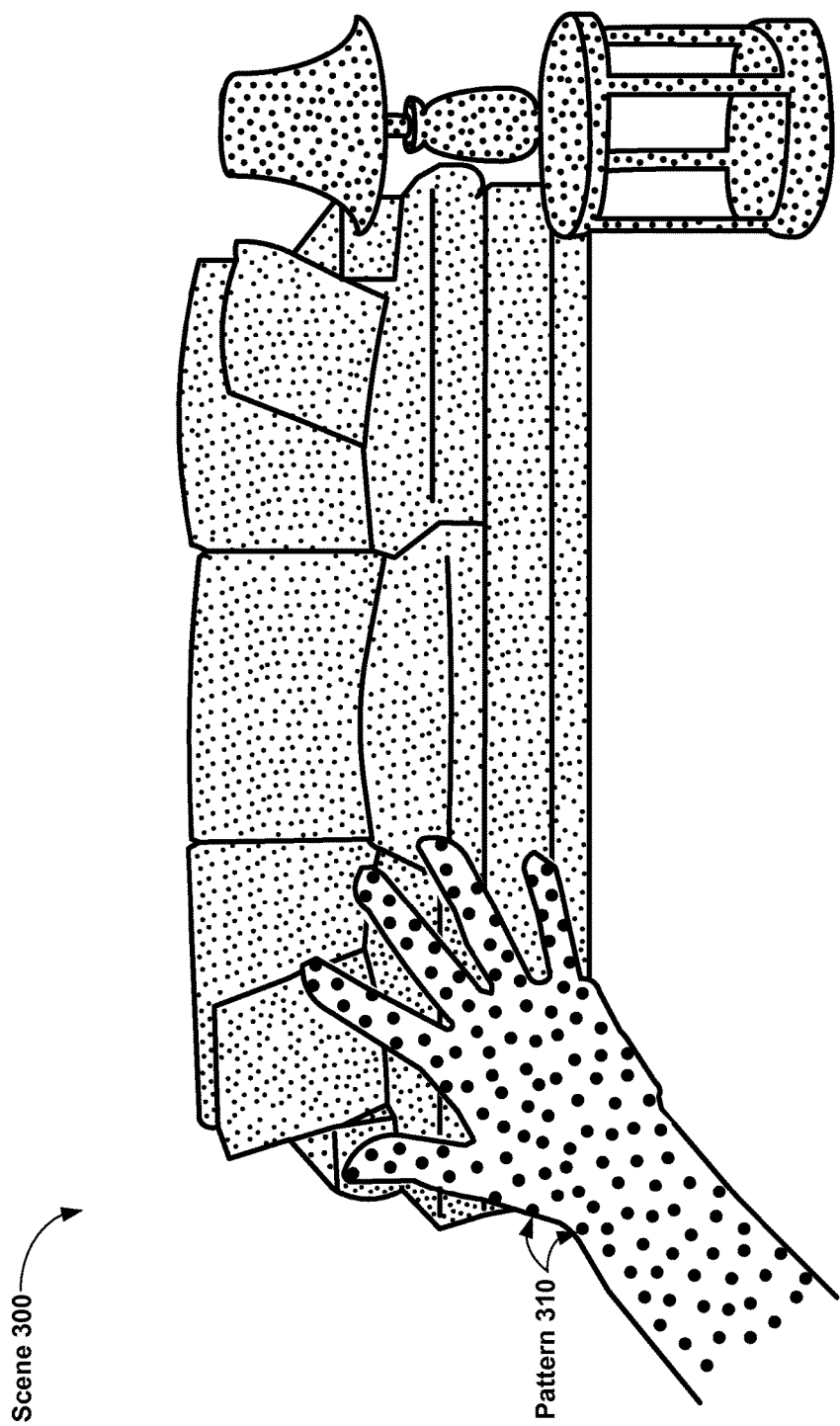

FIGS. 3A-3B illustrate exemplary procedures for projecting structured light on a scene, in accordance with some embodiments. FIG. 3A shows scene 300 including hand 302 at a first general distance, lamp 304 at a second general distance (further than the first general distance), and couch 306 at a third general distance (further than the second general distance). (These distances are referred to as general because each of these objects is three-dimensional and thus has some variation in its depth.) FIG. 3B shows scene 300 including projected structured-light pattern 310, a dot pattern. FIG. 3B further shows the dots from pattern 310 larger and denser at closer distances. Pattern 310 is projected by a projector (e.g., projector 104, FIG. 1). In some embodiments, the structured-light patterns applied to a scene include dot patterns, line patterns, grid patterns, and/or other patterns incorporating structured light of various shapes.

Figure 4A:
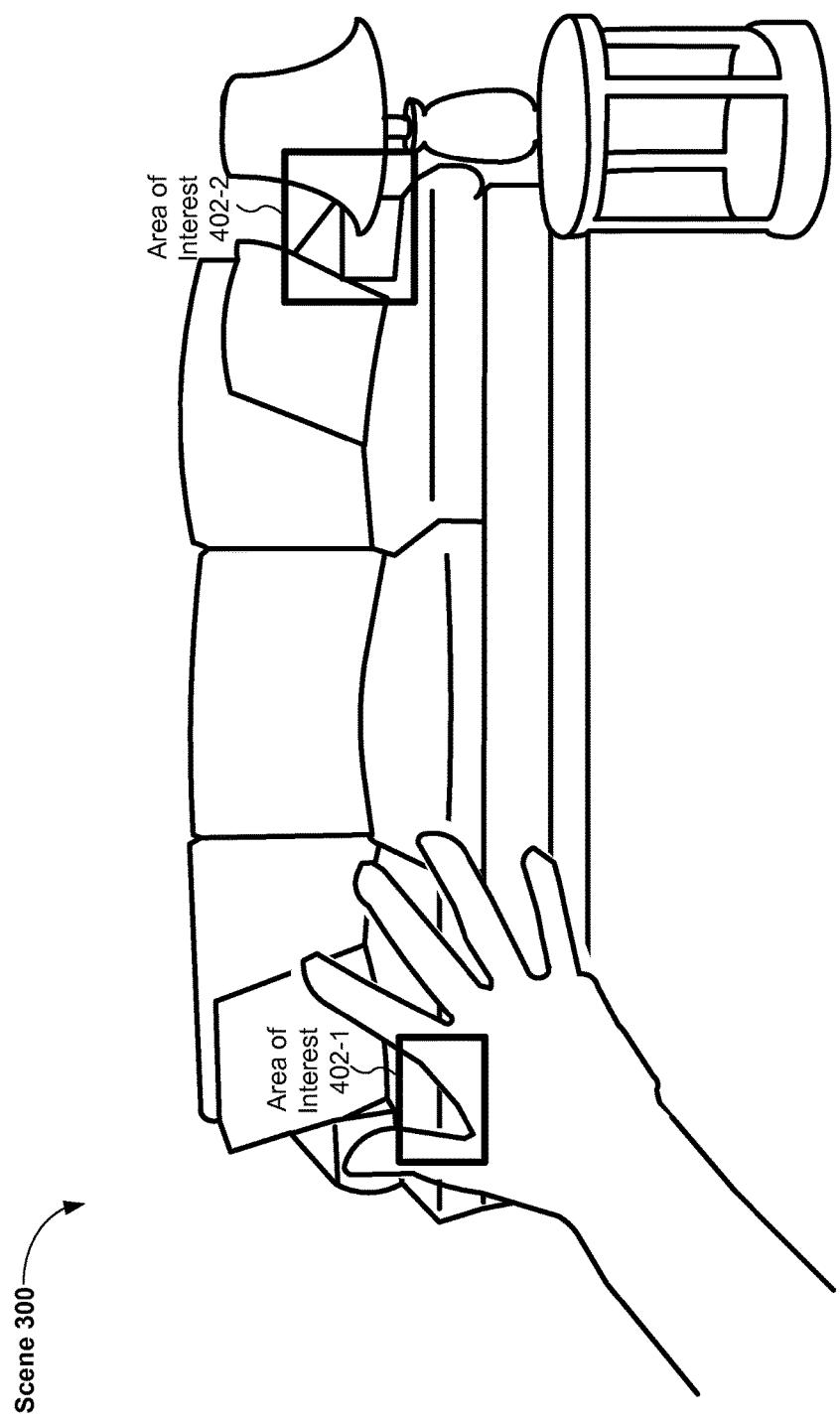
FIGS. 4A-4D illustrate exemplary procedures for projecting structured light on areas of interest in a scene, in accordance with some embodiments.
Figure 4B:
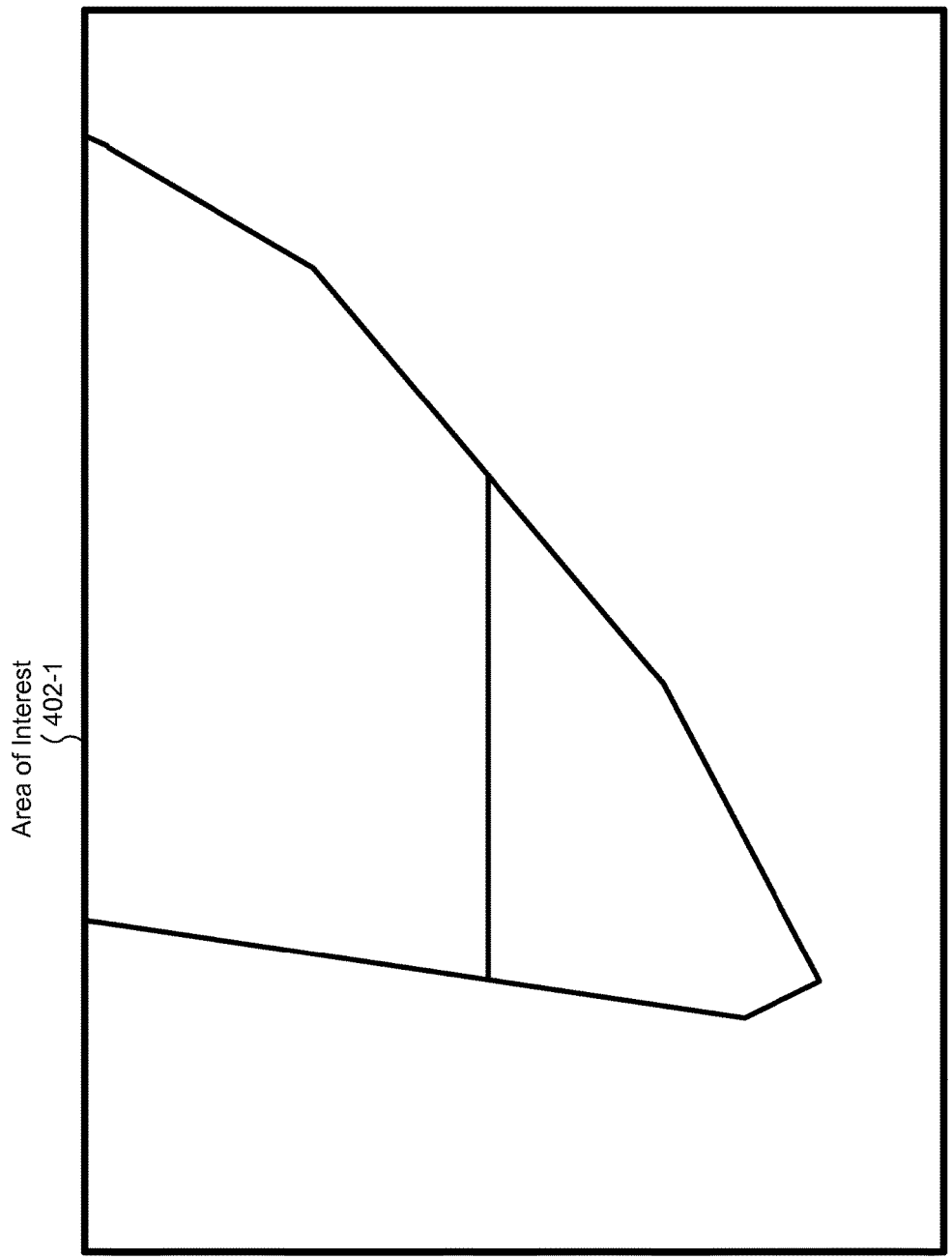
Figure 4C:
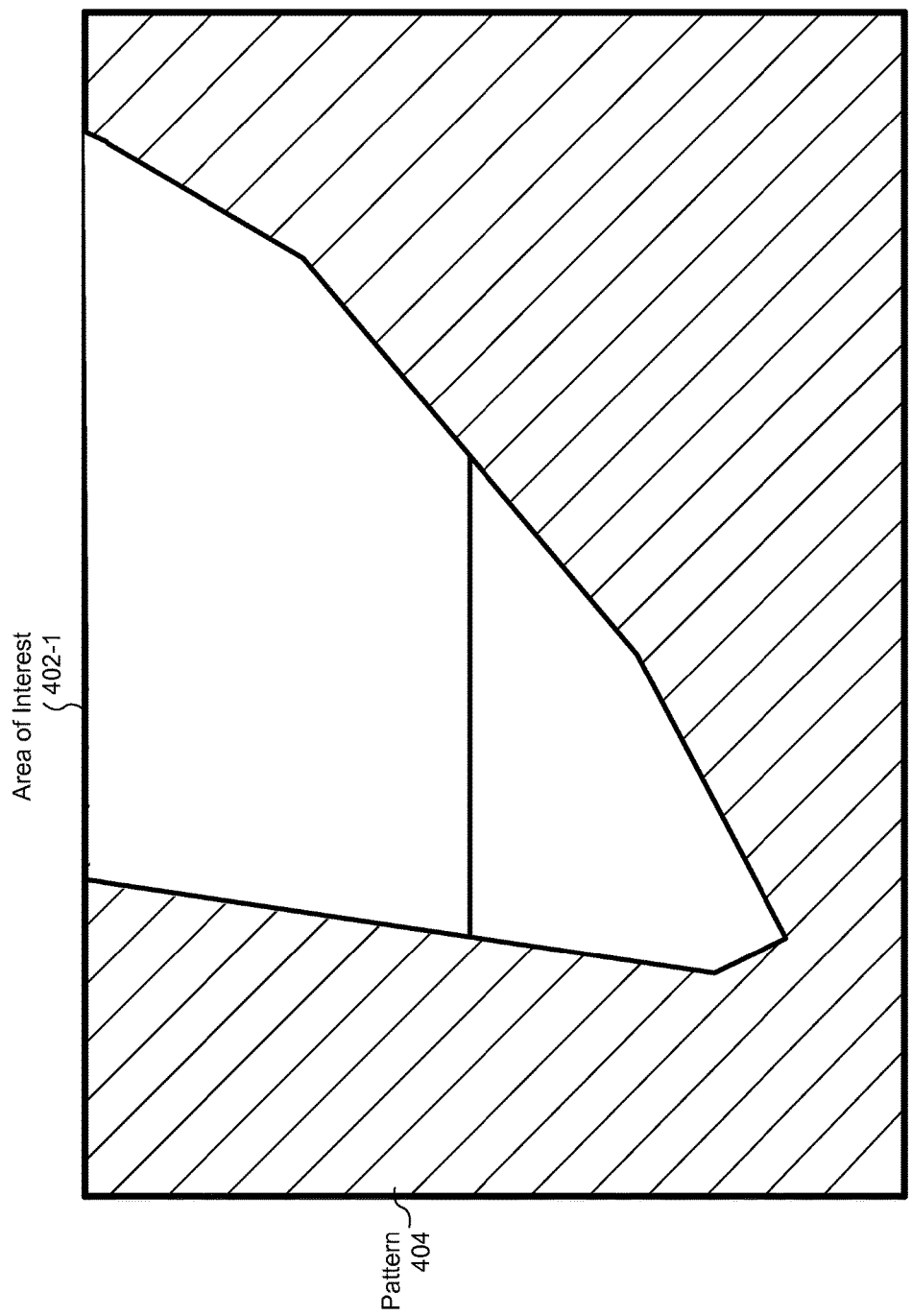
Figure 4D:
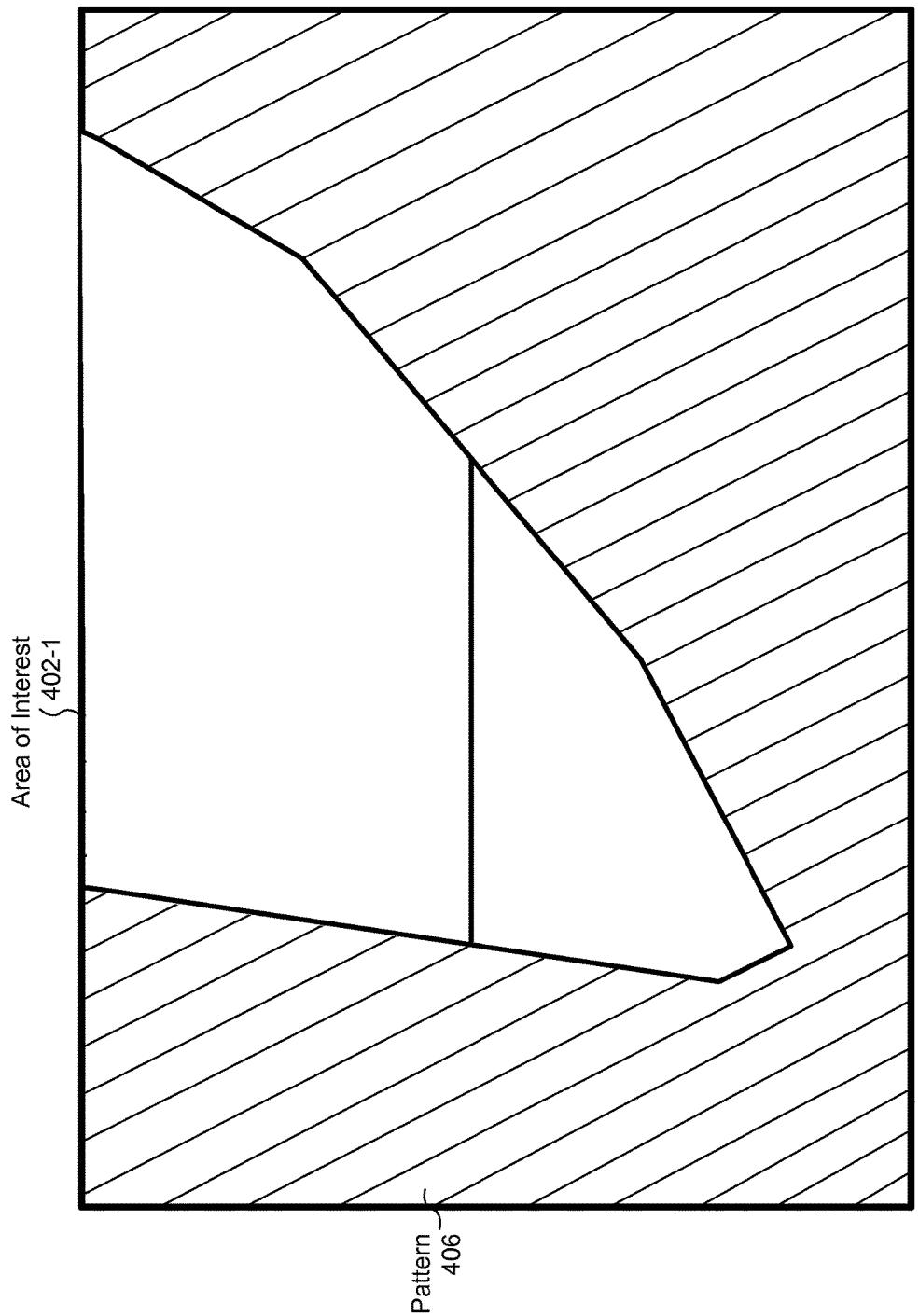

FIGS. 4A-4D illustrate exemplary procedures for projecting structured light on areas of interest in scene 300, in accordance with some embodiments. FIG. 4A shows scene 300 with identified areas of interest 402 (e.g., area of interest 402-1 and 402-2). FIGS. 4B-4D show an enlarged view of area of interest 402-1. FIG. 4B shows area of interest 402-1 without a structured-light pattern projected on it. FIG. 4C shows area of interest 402-1 with projected structured-light pattern 404, a line pattern with parallel lines. FIG. 4C also shows the lines of pattern 404 effectively disappear in the far field, the far field being the part of couch 306 behind hand 302 in this instance. The lines of pattern 404 effectively disappear in the far field due to different spatial frequencies for the projected lines of pattern 404 on each respective object (e.g., hand 302 and couch 306). The lines have different spatial frequencies due to the differences in distance between each respective object. FIG. 4D shows area of interest 402-1 with projected structured-light pattern 406, a second line pattern. Pattern 406 is a line pattern rotated with respect to pattern 404 (i.e., the lines of pattern 406 are rotated with respect to the lines of pattern 404). FIG. 4D also shows the lines of pattern 406 effectively disappear in the far field. In some embodiments, an apparatus calculates the depths of features within an area of interest based on the distortion in the projected pattern (e.g., the gradation and/or curve in the projected lines or the angle between portions of a respective line at an edge). In accordance with some embodiments, an apparatus dynamically generates patterns of structured-light based on the features of objects within a particular area of interest (e.g., generates line patterns in which respective lines intersect an object's edge at a specified angle).

Figure 5A:
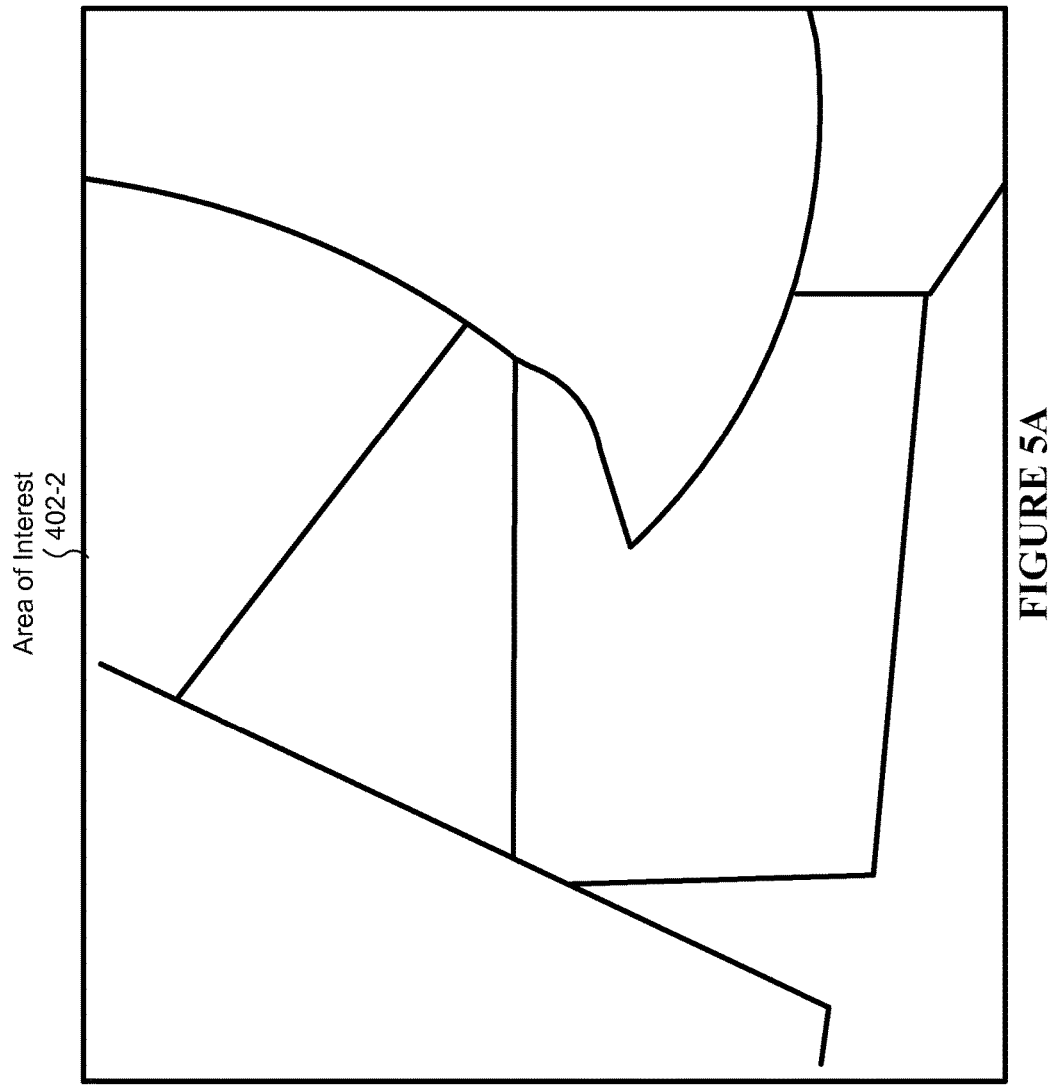
FIGS. 5A-5B illustrate additional exemplary procedures for projecting structured light on an area of interest in a scene, in accordance with some embodiments.
Figure 5B:
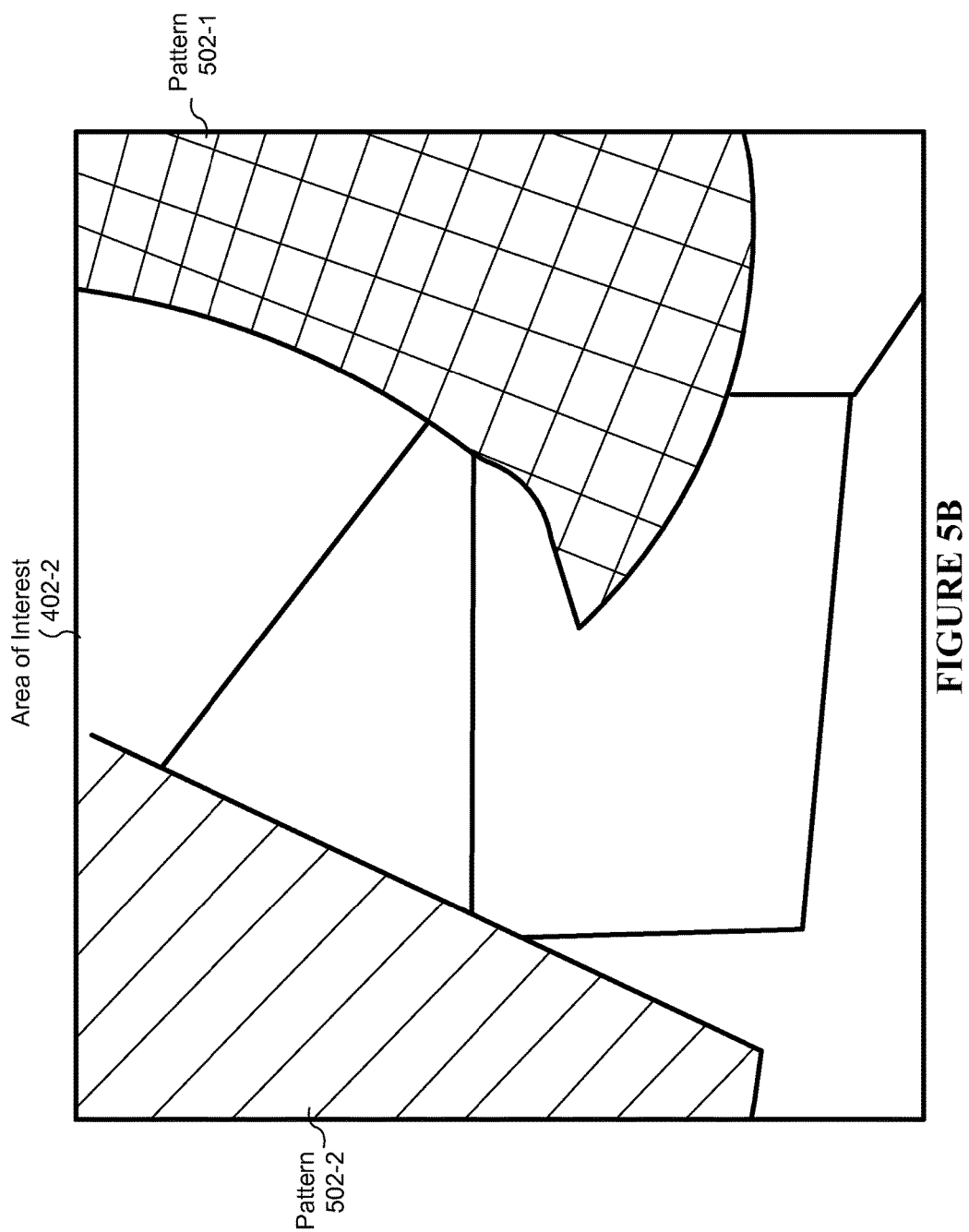

FIGS. 5A-5B illustrate additional exemplary procedures for projecting structured light on area of interest 402-2 in scene 300, in accordance with some embodiments. FIGS. 5A-5B show an enlarged view of area of interest 402-2. FIG. 5B shows area of interest 402-2 with projected structured-light patterns 502. Pattern 502-1 is a line pattern with parallel lines. Pattern 502-2 is a grid pattern, which may be considered a type of line pattern with parallel and perpendicular lines arranged in a grid. Pattern 502-1 is projected along the edges of lamp 304 and pattern 502-2 is projected along the edges of a pillow on couch 306. In accordance with some embodiments, pattern 502-1 and pattern 502-2 are parts of a single pattern. Thus, in accordance with some embodiments, a pattern includes lines that are generated to be perpendicular to multiple identified depth disrupting edges within the area of interest (e.g., lines at various orientations relative to one another).

Figure 6A:
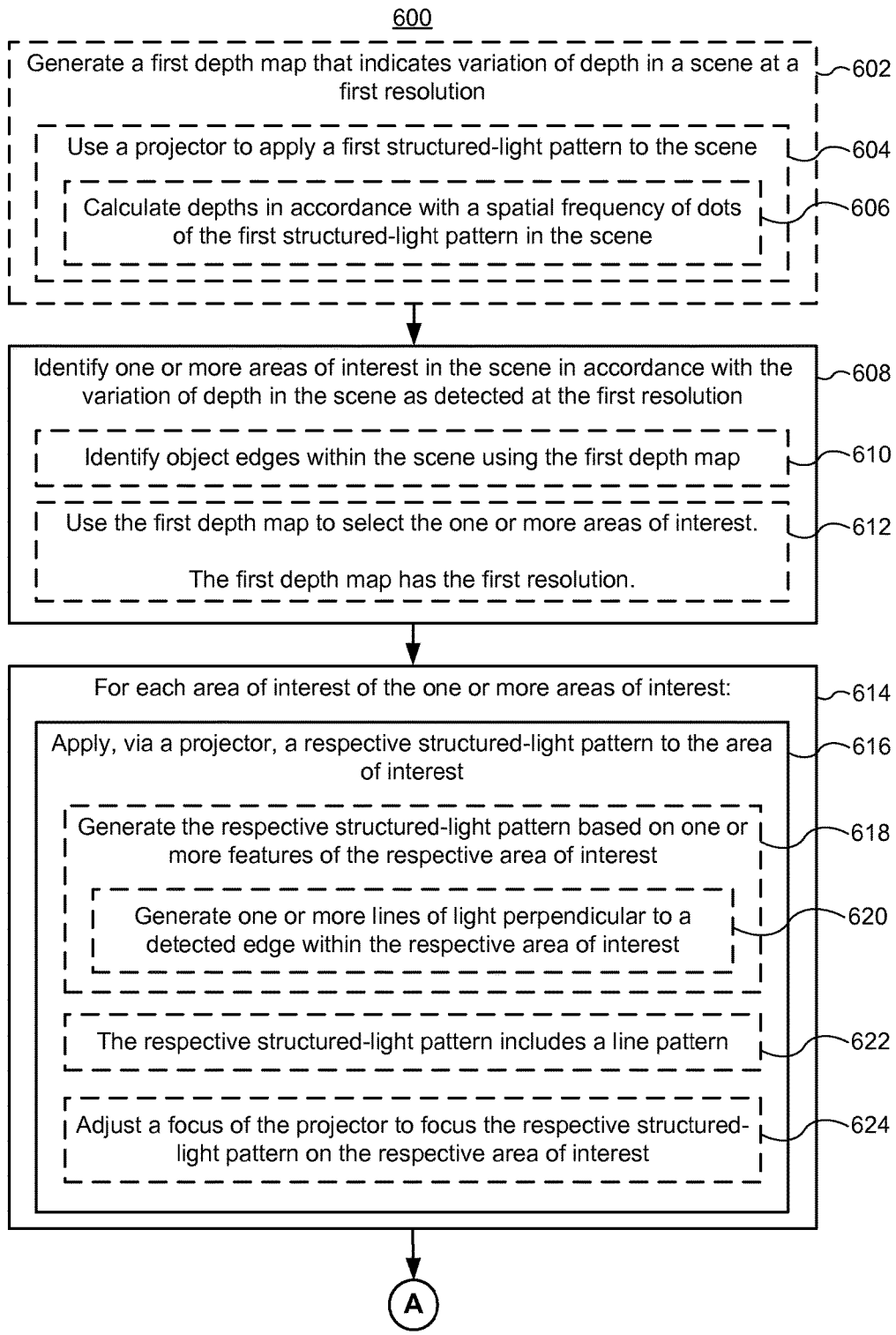
FIGS. 6A-6B are flow diagrams illustrating an exemplary method of depth mapping, in accordance with some embodiments.
Figure 6B:
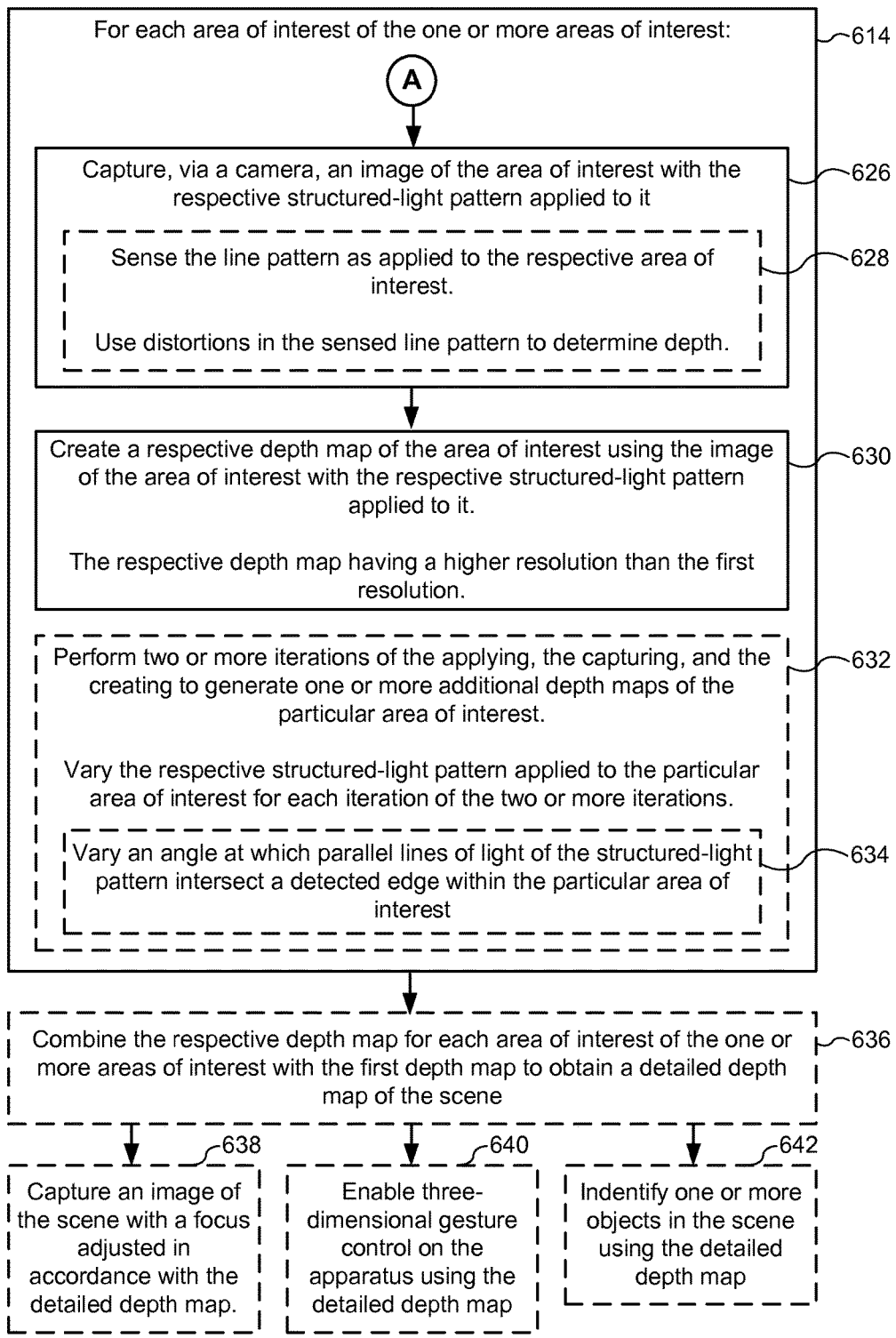

FIGS. 6A-6B are flow diagrams illustrating method 600 of depth mapping, in accordance with some embodiments. In some embodiments, method 600 is governed by instructions that are stored in a non-transitory computer-readable storage medium (e.g., in memory 206, FIG. 2) and that are executed by one or more processors of an apparatus (e.g., processor(s) 202 of device 150, FIG. 2). In some embodiments, method 600 is performed at an apparatus comprising a projector, a camera, one or more processors, and memory storing one or more programs for execution by one or more processors. As described below, method 600 provides a way to efficiently generate more precise depth maps.

In some embodiments, the apparatus generates (602) a first depth map that indicates the variation of depth in a scene at a first resolution (e.g., using depth module 236, FIG. 2). In some embodiments, the first depth map is generated using a structured-light pattern. For example, the first depth map is generated using a dot pattern (e.g., pattern 310 as shown in FIG. 3B). In some embodiments, the structured-light pattern includes dots, lines, and/or other shapes of structured light.

In some embodiments, to generate the first depth map the apparatus uses (604) a projector (e.g., projector 104, FIG. 2) to apply a first structured-light pattern (e.g., pattern 310, FIG. 3B) to the scene. In some embodiments, the first structured-light pattern is distinct from structured-light patterns subsequently applied to particular areas of interest within the scene. For example, pattern 310 in FIG. 3B is distinct from pattern 404 in FIG. 4C and pattern 406 in FIG. 4D as well as patterns 502 in FIG. 5B. In some embodiments, the projector is a pico projector.

In some embodiments, the apparatus calculates (606) depths in accordance with a spatial frequency of dots of the first structured-light pattern in the scene (e.g., using depth mapping sub-module 242, FIG. 2). Thus, in some embodiments, the first structured-light pattern includes a dot pattern and generating the first depth map includes calculating depths in accordance with a spatial frequency of dots in the scene. For example, the apparatus calculates depths in accordance with the spatial frequency of dots in pattern 310 as shown in FIG. 3B.

In some embodiments, the first structured-light pattern includes a line pattern.

In some embodiments, the first depth map is obtained from an external source, distinct from the apparatus (e.g., obtained via communication interface(s) 204, FIG. 2). In some embodiments, the first depth map is generated using stereo cameras. For example, each camera generates a 2-D frame and the frames are combined to create a 3-D image using a known distance between the cameras and differences in object positions between the two frames. In some embodiments, the first depth map is generated using a time-of-flight sensor (e.g., a time-of-flight camera). For example, the device emits an outgoing beam then measures the phase shift of the beam at the sensor (receiver).

The apparatus identifies (608) one or more areas of interest in the scene in accordance with variation of depth in the scene as detected at the first resolution (e.g., using area of interest sub-module 241, FIG. 2). In some embodiments, areas of interest in the scene are identified in accordance with identification of depth disrupting edges. For example, FIG. 4A shows areas of interest 402 identified in scene 300 using their depth disrupting edges. Area of interest 402-1 includes depth disrupting edges between hand 302 and couch 306 and area of interest 402-2 includes depth disrupting edges between lamp 304 and couch 306. In some embodiments, the one or more areas of interest in the scene are identified in accordance with a focus of the apparatus (e.g., a focus of a camera on the apparatus). In some instances, the focus is auto-set and, in other instances, the focus set by a user of the apparatus.

In some embodiments, the apparatus uses (610) the first depth map to select the one or more areas of interest (e.g., using area of interest sub-module 241, FIG. 2) and the first depth map has the first resolution. For example, the apparatus identifies (612) edges within the scene using the first depth map (e.g., using edge detection sub-module 240, FIG. 2) and identifies the one or more areas of interest accordingly. Areas of interest 402 in FIG. 4A may be identified using a depth map generated by capturing an image of scene 300 illuminated with projected pattern 310 in FIG. 3B. In some embodiments, the one or more areas of interest include the entire scene.

For each area of interest (614), the apparatus applies (616), via a projector (e.g., projector 104, FIG. 2), a respective structured-light pattern to the area of interest (e.g., using projection module 230, FIG. 2). For example, FIG. 4A shows areas of interest 402, FIG. 4C shows structured-light pattern 404 applied to area of interest 402-1, and FIG. 5B shows structured-light patterns 502-1 and 502-2 applied to area of interest 402-2.

In some embodiments, to apply a structured-light pattern to a respective area of interest, the apparatus generates (618) the respective structured-light pattern based on one or more features of the respective area of interest (e.g., using pattern module 232, FIG. 2). FIG. 5B shows projected patterns 502 generated such that lines within each pattern are projected across depth disrupting edges (e.g., the edges of lamp 304)

with a specified orientation (e.g., such that at least some lines intersect an object's edge from one side at a specified angle).

For example, the apparatus generates (620) one or more lines of light perpendicular to a detected edge within the respective area of interest (e.g., using pattern module 232, FIG. 2). Thus, in some embodiments, generating the respective structured-light pattern based on the one or more features of the respective area of interest includes generating one or more lines of light perpendicular to a detected edge within the respective area of interest. FIG. 5B shows projected patterns 502 generated such that lines within each pattern are perpendicular to the detected edges (e.g., the edges of lamp 304).

In some embodiments, the respective structured-light pattern includes (622) a line pattern. For example, patterns 502 in FIG. 5B include line patterns. In some embodiments, the respective line pattern includes a grid of perpendicular lines. For example, pattern 502-1 in FIG. 5B includes a grid of perpendicular lines. In some embodiments, the respective structured-light pattern includes dots, lines, and/or other shapes of structured light.

In some embodiments, the apparatus adjusts (624) a focus of the projector to focus the respective structured-light pattern on the respective area of interest (e.g., using projection module 230 and/or focus module 238, FIG. 2). For example, projector 104 shown in FIG. 1 focuses on area of interest 402-2 as shown in FIG. 5B, such that patterns 502 are primarily applied within the area of interest. In some embodiments, the apparatus adjusts a focus of a camera (e.g., camera 102, FIG. 2) to focus on the respective area of interest.

For each area of interest (614, FIG. 6B), the apparatus captures (626), via a camera (e.g., camera 102, FIG. 2), an image of the area of interest with the respective structured-light pattern applied to it (e.g., using imaging module 234, FIG. 2). For example, the camera captures area of interest 402-2 with patterns 502 applied as shown in FIG. 5B. In some embodiments, the projector projects the structured-light pattern at a wavelength not generally visible to the human eye (e.g., infrared wavelengths) and the camera is configured to capture the projected structured-light patterns at the given wavelength(s). For example, the camera is an infrared camera and the projector uses infrared lasers or LEDs.

In some embodiments, the apparatus senses (628) the line pattern as applied to the respective area of interest (e.g., using imaging module 234, FIG. 2) and uses distortions in the sensed line pattern to determine depth (e.g., using depth module 236, FIG. 2). Thus, in some embodiments, capturing (626) the image includes sensing the line pattern as applied to the respective area of interest; and creating (630, below) the respective depth map for the respective area of interest includes using distortions in the sensed line pattern to determine depth. For example, device 100 senses pattern 404 applied to area of interest 402-1 as shown in FIG. 4C and uses the distortions of lines within sensed pattern 404 to determine depth.

For each area of interest (614), the apparatus creates (630) a respective depth map of the area of interest using the image of the area of interest with the respective structured-light pattern applied to it (e.g., using depth module 2326 FIG. 2). The respective depth map has a higher resolution than the first resolution. For example, device 100 generates a respective depth map for area of interest 402-1 using an image of area of interest 402-1 with pattern 404 applied, as shown in FIG. 4C, and/or generates a respective depth map for area of interest 402-2 using an image of area of interest 402-2 with patterns 502-1 and 502-2 applied, as shown in FIG. 5B. In some embodiments, the respective depth map for each area of interest has a higher resolution than the first depth map.

In some embodiments, the apparatus performs (632) two or more iterations of the applying (616), the capturing (626), and the creating (630) to generate one or more additional depth maps of a particular area of interest (or of each area of interest or a subset thereof). In addition, the apparatus varies the respective structured-light pattern applied to the particular area of interest for each iteration of the two or more iterations (e.g., using pattern module 232 and/or projection module 230, FIG. 2). In some embodiments, the apparatus compares and/or combines the additional depth maps to generate a more precise depth map for the particular area of interest. In some embodiments, the apparatus: (1) applies multiple structured-light patterns to a particular area, (2) obtains multiple depth maps, and (3) compares and/or combines the depth maps to increase the depth precision for the particular area. In some embodiments, a particular structured-light pattern is adjusted (e.g., rotated 5-10 degrees) for each iteration. For example, FIG. 4C shows area of interest 402-1 with pattern 404 applied and FIG. 4D shows area of interest 402-2 with pattern 406 applied. Pattern 406 is generated by rotating pattern 404. In some embodiments, the iterations are continued until particular projected lines within the structured-light pattern are determined to be perpendicular to respective depth disrupting edges within the area of interest.

In some embodiments, the apparatus adjusts the structured light pattern by varying (634) an angle at which parallel lines of light of the structured-light pattern intersect a detected edge within the particular area of interest (e.g., using pattern module 232, FIG. 2), such that the angle is distinct in each iteration. For example, FIG. 4C shows area of interest 402-1 with pattern 404 applied such that the lines of pattern 404 intersect the edges of hand 302 at a first angle; and FIG. 4D shows area of interest 402-2 with pattern 406 applied such that the lines of pattern 406 intersect the edges of hand 302 a second angle, distinct from the first angle.

In some embodiments, the apparatus combines (636) the respective depth map for each area of interest of the one or more areas of interest with the first depth map to obtain a detailed depth map of the scene (e.g., using depth module 236, FIG. 2). In some embodiments, at least a portion of the detailed depth has a higher resolution than the first depth map (e.g., is more precise), since each respective depth map has a higher resolution than the first depth map. In some embodiments, the apparatus combines the respective depth map for each of at least a subset of the one or more areas of interest with the first depth map to obtain a detailed depth map of the scene. In some embodiments, the apparatus sends the respective depth maps to an external device (e.g., via communication interface(s) 204, FIG. 2) and receives the detailed depth map from the external device (e.g., via communication interface(s) 204).

In some embodiments, the apparatus captures (638) an image of the scene (e.g., using imaging module 234 in conjunction with camera 102, FIG. 2) with a focus adjusted in accordance with the detailed depth map (e.g., adjusted using focus module 238, FIG. 2). Alternatively, the focus is adjusted in accordance with a respective depth map for an area of interest. Thus, in some embodiments, the apparatus adjusts a focus of the camera in accordance with the detailed depth map; and captures an image of the scene with the adjusted focus.

In some embodiments, the apparatus identifies (640) one or more objects in the scene (e.g., using object recognition module 244, FIG. 2) using the detailed depth map. For example, device 100 identifies hand 302, lamp 304, and/or couch 306 in scene 300 as shown in FIG. 3A.

In some embodiments, the apparatus enables (642) three-dimensional (3-D) gesture control (e.g., using 3-D module 246, FIG. 2) on the apparatus using the detailed depth map. In some embodiments, the apparatus uses the detailed depth map to improve 3-D gesture control. For example, the apparatus uses the detailed depth map to enable more accurate gesture recognition than otherwise available.

Attention is now directed to selective flash illumination, embodiments of which are described with respect to FIGS. 7A-10B.

FIGS. 7A-7D are diagrams illustrating exemplary implementations of a flash array. FIGS. 7A-7C show top-down views of various flash arrays. FIG. 7A shows flash array 700 including flash elements 702, 704, 706, 708, and 709 with varying sizes. FIG. 7B shows flash array 710 including flash elements 712, 714, 716, 718, 720, 722, 724, 726, 728, and 730. FIG. 7B further shows flash elements with varying shapes such as flash element 712 (rounded rectangle) and flash element 726 (circle). (Alternatively, the flash elements in an array may be of identical shapes and/or sizes.) In some embodiments, the flash elements of flash array 700 and/or flash array 710 are LEDs (e.g., OLEDs) while in other embodiments the flash elements, or a subset of the flash elements, are other optical devices such as flashbulbs or air-gap flash devices.

FIG. 7C shows flash array 750 including LEDs 752 (e.g., LED 752-1 through 752-15). In some embodiments, individual LEDs 752 are the same size and shape as one another (as shown in FIG. 7C) while in other embodiments individual LEDs 752 vary in size and/or shape (as shown in FIG. 7B). In some embodiments, LEDs 752 are OLEDs.

Figure 7D:
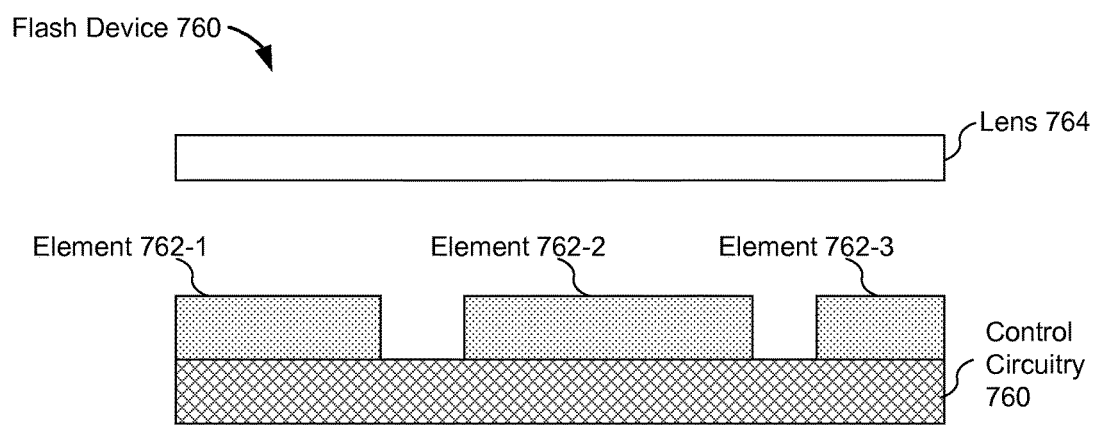

FIG. 7D shows a side-view of flash device 760. Flash device 760 includes lens 764, flash elements 762, and control circuitry 760. In some embodiments, lens 764 is a Fresnel lens while in other embodiments other types of lenses are used. In some embodiments, various subsets of flash elements 762 are coupled to distinct lenses. For example, each flash element 762 is coupled to a distinct Fresnel lens. In some embodiments, multiple distinct types of Fresnel lenses are used. In some embodiments, flash elements 762 are LEDs. In some embodiments, control circuitry 760 includes, or is coupled to, a substrate. In some embodiments, control circuitry 760 is coupled to one or more processors (e.g., processor(s) 202, FIG. 2) and/or memory (e.g., memory 206, FIG. 2). In some embodiments, control circuitry 760 includes one or more controllers 254 (FIG. 2) (e.g., one or more processors). In some embodiments, control circuitry 760 is configured to supply distinct power levels to each of the elements 762 (or to respective groups of elements 762), such that the power levels provided to each element 762 (or to each group of elements 762) is independently controlled. For example, control circuitry 760 is configured to supply an individually controllable, and thus potentially distinct, amount of electrical current to each of the elements 762. In some embodiments, control circuitry 760 is governed by a flash module (e.g., flash module 248, FIG. 2).

In some embodiments, flash 108 (FIGS. 1B and 2) includes at least one of: flash array 700 (FIG. 7A), flash array 710 (FIG. 7B), flash array 750 (FIG. 7C) and flash device 760 (FIG. 7D). The flash arrays 700, 710, and 750 are examples of flash arrays 252 (FIG. 2).

Figure 8:
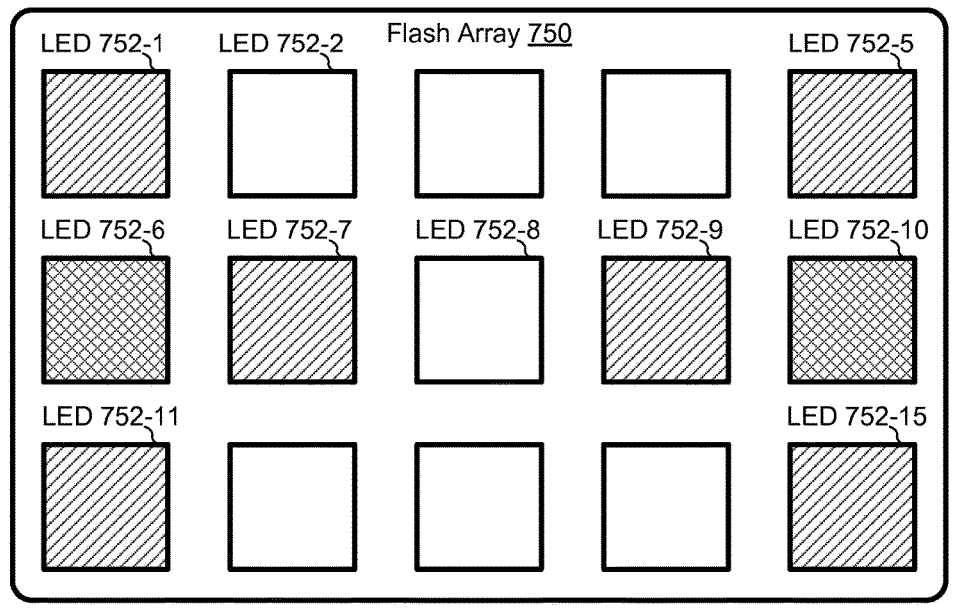
FIG. 8 illustrates exemplary flash optimization for directing flash illumination toward areas of interest in a scene.
Figure 8:
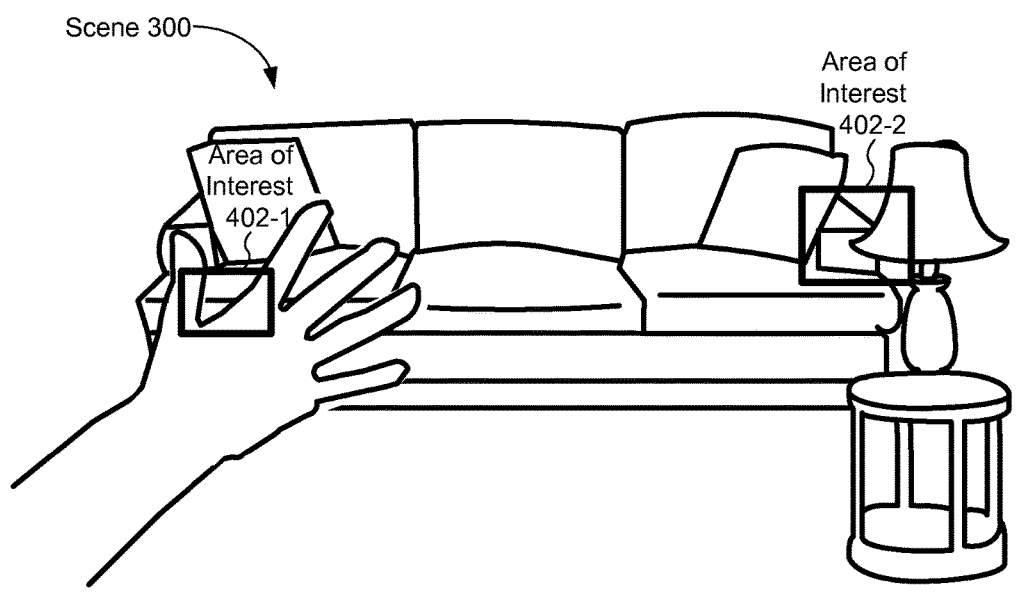

FIG. 8 illustrates exemplary direction of flash illumination toward areas of interest in a scene. FIG. 8 shows scene 300 including identified areas of interest 402-1 and 402-2. FIG. 8 further shows flash array 750 including LEDs 752. In the example of FIG. 8, flash illumination is directed toward areas of interest 402-1 and 402-2 by varying the power levels supplied to LEDs 752. In this example, LED 752-6 and 752-10 are supplied with the highest power level, denoted by cross-hashed patterns; LEDs 752-1, 752-5, 752-7, 752-9, 752-11, and 752-15 are supplied with an intermediate power level, denoted by lined patterns; and remaining LEDs 752 are supplied with a lower power. In some embodiments, other LEDs 752 are supplied with the highest power level and/or the intermediate power level. For example, LED 752-2 is supplied with the intermediate power level. In some embodiments, the lowest power level represents no power being supplied (e.g., the corresponding LEDs are off) while in other embodiments, each LED 752 is supplied with some power (e.g., is on). In some embodiments, more than three power levels are supplied. For example, LED 752-7 is supplied with a second intermediate power level, distinct from the power level supplied to LED 752-1. In some embodiments, each LED 752 is supplied with a distinct power level. Thus, in accordance with some embodiments, flash array 750 is supplied with fifteen distinct power levels (e.g., one power level for each LED in the array).

Figure 9A:
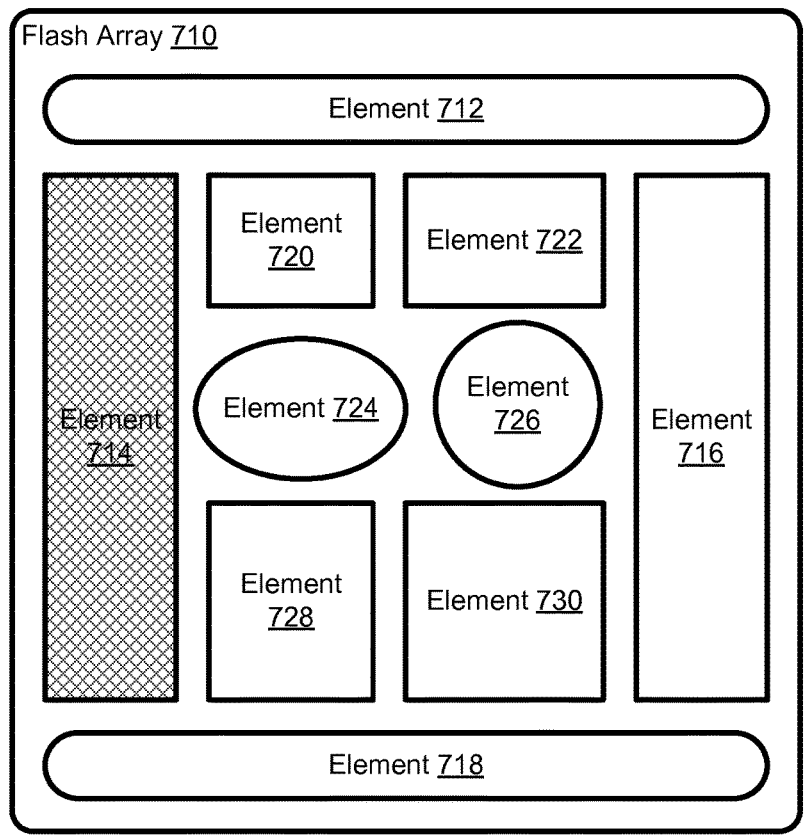
FIGS. 9A-9C illustrate exemplary flash optimization for directing flash illumination toward a moving area of interest in a scene.
Figure 9A:
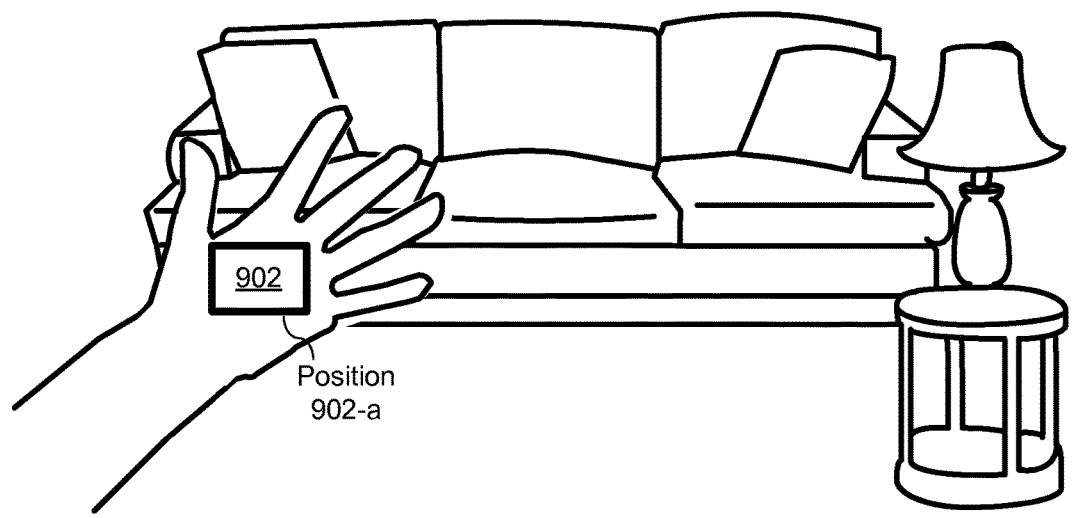
Figure 9B:
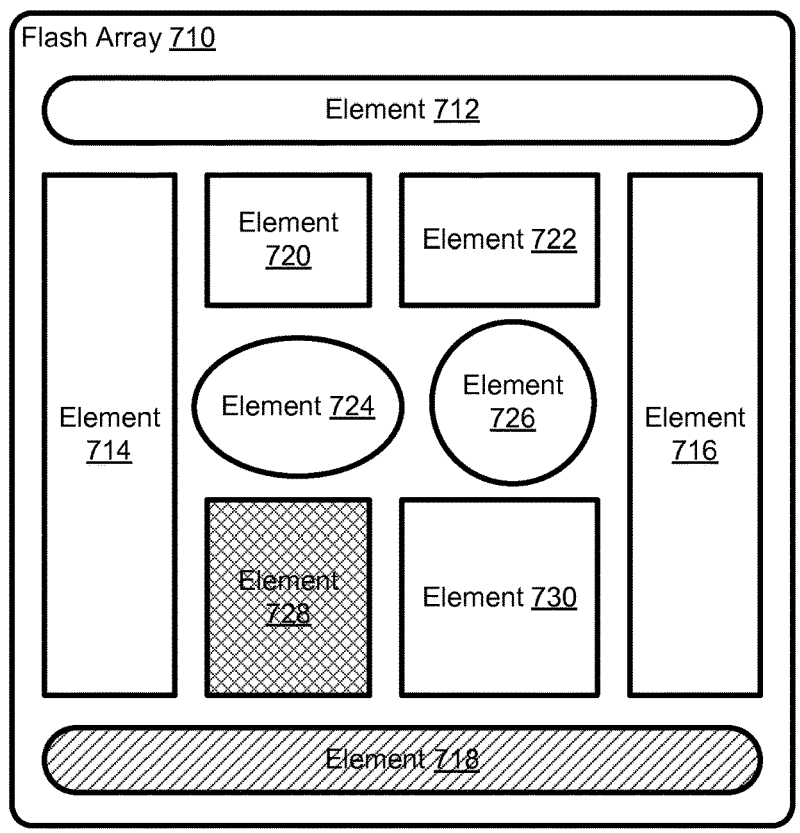
Figure 9B:
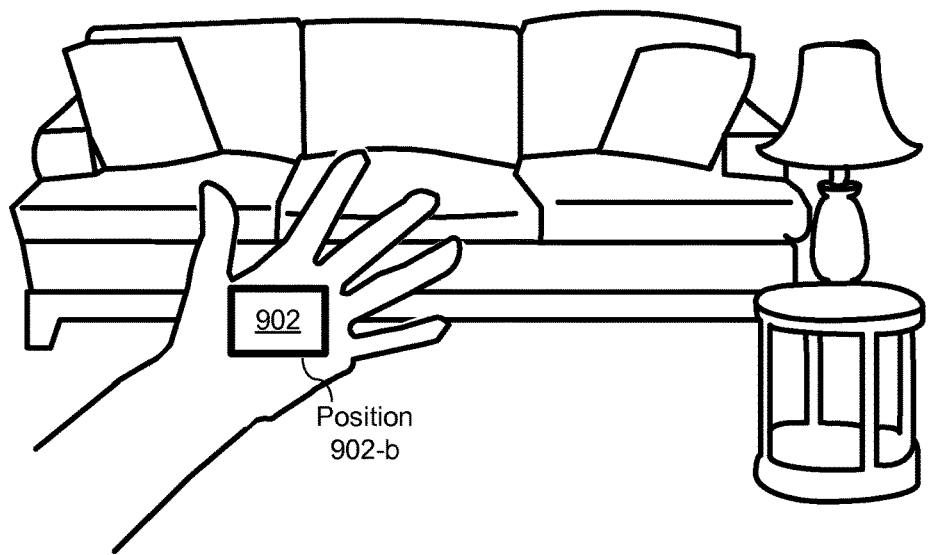
Figure 9C:
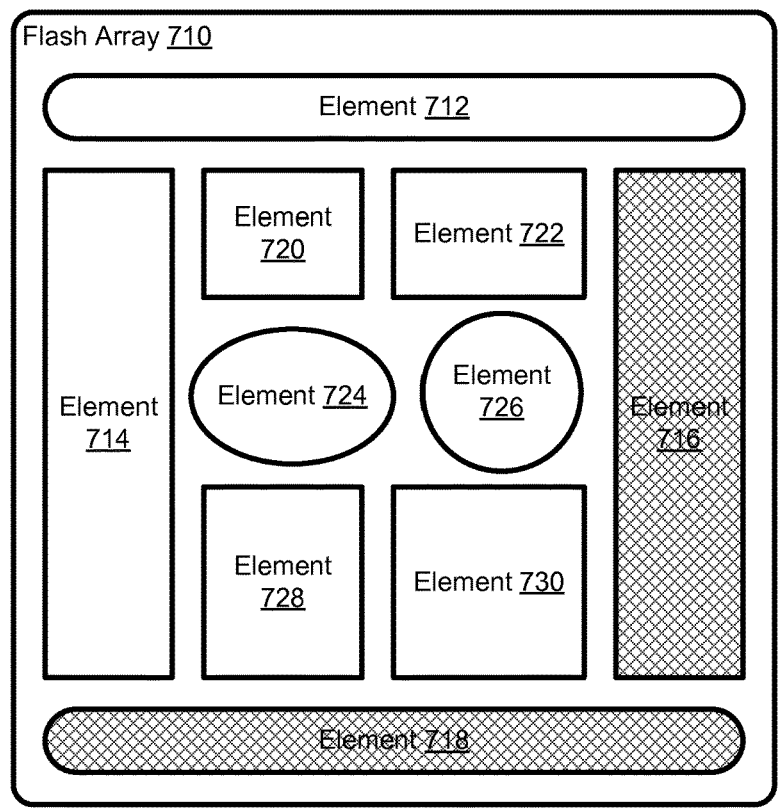
Figure 9C:
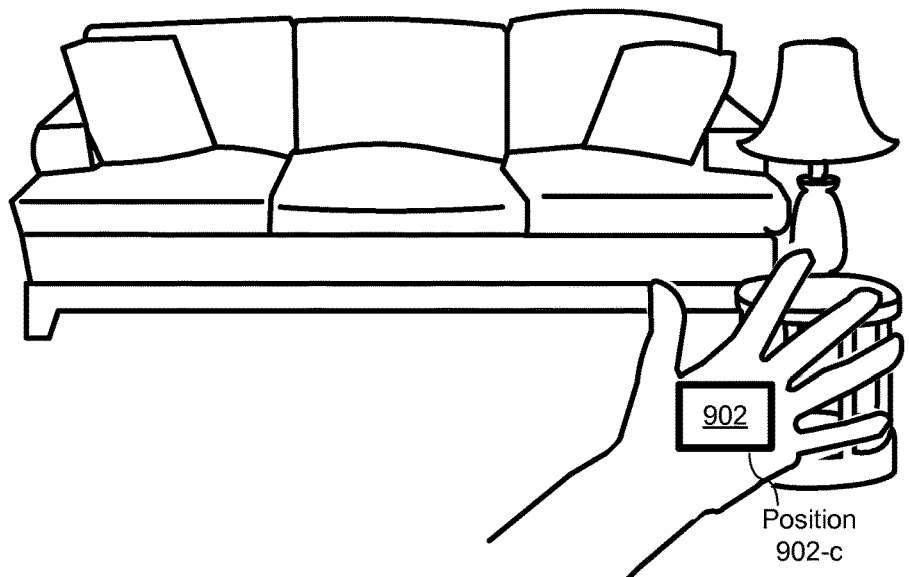

FIGS. 9A-9C illustrate exemplary flash optimization for directing flash illumination toward a moving area of interest in a scene. FIG. 9A shows scene 300 with identified area of interest 902 at position 902-a. FIG. 9A further shows flash array 710 including flash elements 712 through 730. In the example of FIG. 9A, flash illumination is directed toward area of interest 902 (e.g., the palm of hand 302) by supplying more power to flash element 714 than to the other flash elements in flash array 710. In some embodiments, other flash elements adjacent to flash element 714 (e.g., flash elements 720, 724, 728, 712, and/or 718) are supplied more power than non-adjacent flash elements (e.g., flash element 730). In some embodiments, all flash elements other than flash element 714, or other than flash element 714 and one or more adjacent flash elements, are not supplied power and thus do not produce light.

FIG. 9B shows area of interest 902 moving to position 902-b. FIG. 9B further shows flash array 710 directing illumination toward area of interest 902 by supplying a high power level to flash element 728, denoted by the cross-hashed pattern; supplying an intermediate power level to flash element 718, denoted by the lined pattern; and supplying a low power level (which may be no power) to the remaining flash elements. In accordance with some embodiments, a device (e.g., device 150, FIG. 2) predicts the movement of area of interest 902 (e.g., from position 902-a to position 902-b) with a motion prediction module (e.g., motion prediction module 250, FIG. 2) and directs flash illumination based on the predicted movement.

FIG. 9C shows area of interest 902 moving to position 902-c. FIG. 9C further shows flash array 710 directing illumination toward area of interest 902 by supplying a high power level to flash elements 716 and 718, denoted by the cross-hashed pattern; and supplying a low power level (which may be no power) to the remaining flash elements.

Figure 10A:
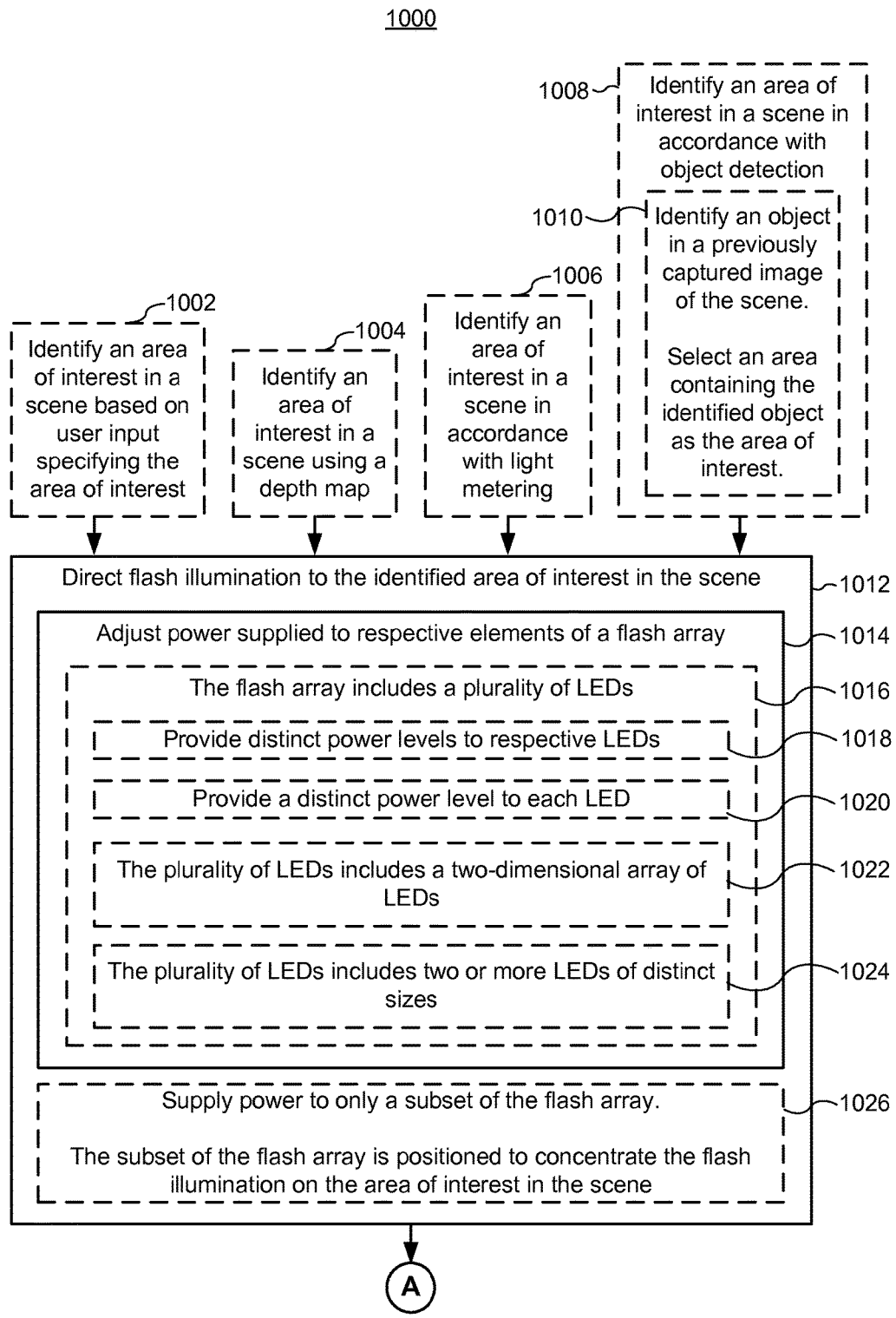
FIGS. 10A-10B are flow diagrams illustrating an exemplary method of flash optimization, in accordance with some embodiments.
Figure 10B:
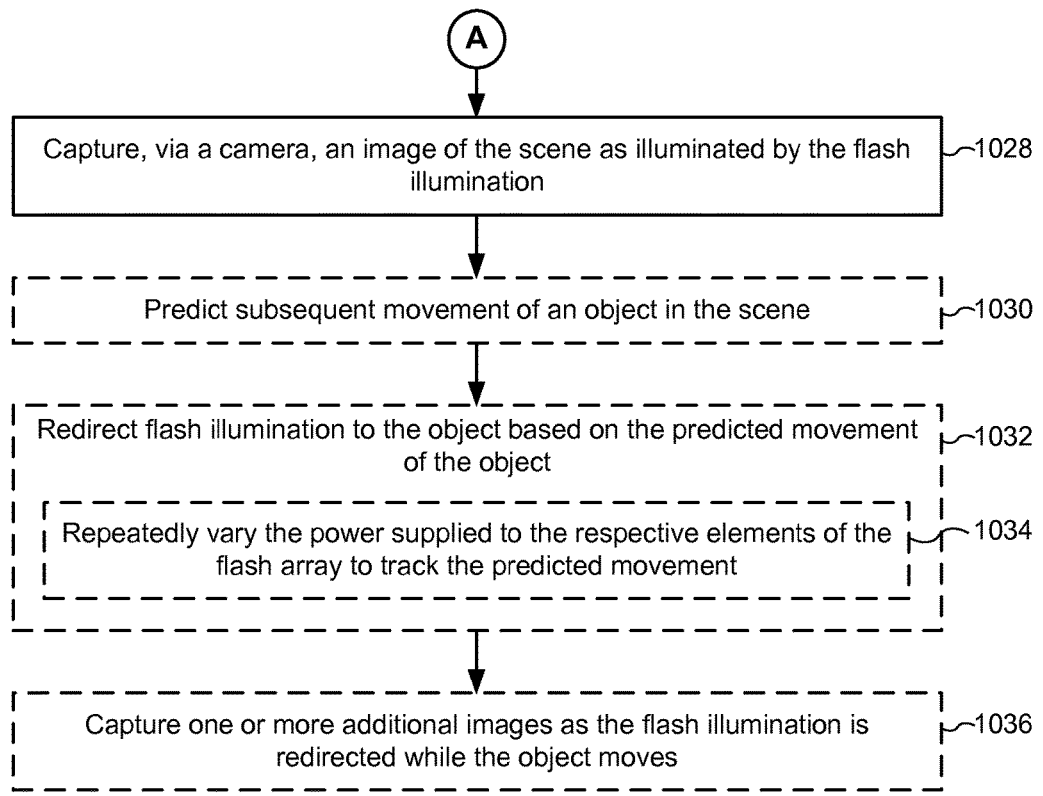

FIGS. 10A-10B are flow diagrams illustrating exemplary method 1000 of generating and using directed flash illumination, in accordance with some embodiments. In some embodiments, method 1000 is governed by instructions that are stored in a non-transitory computer-readable storage medium (e.g., in memory 206, FIG. 2) and that are executed by one or more processors of an apparatus (e.g., processor(s) 202 of device 150 and/or controller 254 of flash 108, FIG. 2). In some embodiments, method 1000 is performed at a device (e.g., device 150) comprising a camera, one or more processors, and memory storing one or more programs configured for execution by the one or more processors. As described below, method 1000 provides an efficient and precise way to direct flash illumination toward areas of interest in a scene.

In some embodiments, prior to directing flash illumination, a device identifies (1002) an area of interest (or multiple areas of interest) in the scene (e.g., with area of interest sub-module 241, FIG. 2) based on user input specifying the area(s) of interest. In some embodiments, the user selects a focus target for a camera on the device and the focus target is identified as the area of interest. In some embodiments, the user selects a flash target as the area of interest. In accordance with some embodiments, area of interest 902 in FIG. 9A is identified based on user input (e.g., via user interface 210, FIG. 2). In some embodiments, the device will disregard an area of interest selected by the user (e.g., if the objects in the area of interest are outside of an illuminated capture area for the device). In some embodiments, the device generates an error in accordance with a determination that the user has specified an area of interest containing objects outside of the illuminated capture area (e.g., displays an error message to the user).

In some embodiments, prior to directing flash illumination, the device identifies (1004) an area of interest in a scene (e.g., with area of interest sub-module 241, FIG. 2) using a depth map. In some embodiments, the device generates the depth map (e.g., with depth module 236, FIG. 2). In some embodiments, the device obtains the depth map from an external source (e.g., via communication interface(s) 204, FIG. 2). In accordance with some embodiments, multiple areas of interest (e.g., areas of interest 402, FIG. 8) are identified using a depth map. In some embodiments, the device uses the depth map to determine which objects in the scene are within an illuminated capture area (e.g., illuminated capture area 110, FIG. 1B).

In some embodiments, prior to directing flash illumination, the device identifies (1006) an area of interest in the scene (e.g., with area of interest sub-module 241, FIG. 2) in accordance with light metering. In some embodiments, the device includes one or more light metering components. In some embodiments, the device obtains light metering information from an external source (e.g., via communication interface(s) 204, FIG. 2). In accordance with some embodiments, multiple areas of interest (e.g., areas of interest 402, FIG. 8) are identified in accordance with light metering.

In some embodiments, prior to directing flash illumination, the device identifies (1008) an area of interest (or multiple areas of interest) in a scene (e.g., with area of interest sub-module 241, FIG. 2) in accordance with object detection. In some embodiments, the device detects objects in the scene (e.g., with object recognition module 244, FIG. 2) while in other embodiments, the device obtains object detection information from an external source (e.g., via communication interface(s) 204, FIG. 2). In accordance with some embodiments, area of interest 902 in FIGS. 9A-9C is identified in accordance with object detection (e.g., the detection of hand 302). In some embodiments, the device identifies the area of interest in the scene in accordance with facial detection, such that the area of interest is a face.

In some embodiments, the device identifies (1010) an object in a previously captured image of the scene (e.g., with object recognition module 244, FIG. 2); and selects an area containing the identified object as the area of interest (e.g., with area of interest sub-module 241, FIG. 2). Thus, in some embodiments: (1) the image of operation 1028 (below) is a first image, and (2) identifying the area of interest in the scene in accordance with object detection includes: (a) identifying an object in a second image of the scene that was captured before the first image; and (b) selecting an area containing the identified object as the area of interest. For example, (1) FIG. 9A illustrates the first image; (2) FIG. 3A illustrates a previously captured image of scene 300; and (3) the device identifies hand 302 in FIG. 3A and accordingly selects area of interest 902 in FIG. 9A.

The device directs (1012) flash illumination to the identified area(s) of interest in the scene (e.g., with flash module 248, FIG. 2). For example, FIG. 9A shows area of interest 902 and flash array 710 directing flash illumination toward area of interest 902 (e.g., by supplying a higher power level to flash element 714 than to the other flash elements on the array). In some embodiments, prior to directing flash illumination, the device determines that identified area of interest is within an illuminated capture area for the flash (e.g., illuminated capture area 110, FIG. 1B).

To direct the flash illumination to the identified area(s) of interest, the device adjusts (1014) power supplied to respective elements of a flash array (e.g., with power supply sub-module 249, FIG. 2). For example, FIG. 8 shows areas of interest 402 and flash array 750 directing flash illumination toward the areas of interest by supplying a high power level to LEDs 752-6 and 752-10, supplying an intermediate power level to LEDs 752-1, 752-5, 752-7, 752-9, 752-11, and 752-15, and supplying a lower power level to the remaining LEDs on the array. In some embodiments, the device adjusts the power supplied to the respective elements based in part on distances between the device and objects in the scene (e.g., objects within the identified area of interest).

In some embodiments, the flash array (e.g., flash 108, FIG. 1B) includes (1016) a plurality of LEDs. For example, FIG. 7C shows flash array 750 including LEDs 752.

In some embodiments, the device provides (1018) distinct (or individually controlled) power levels to respective LEDs of the plurality of LEDs (e.g., with power supply sub-module 249, FIG. 2). Thus, in some embodiments, the adjusting (1014) includes providing distinct power levels to respective LEDs of the plurality of LEDs. For example, FIG. 8 shows three distinct power levels provided to LEDs 752: a high power level to LEDs 752-6 and 752-10; an intermediate power level to LEDs 752-1, 752-5, 752-7, 752-9, 752-11, and 752-15; and a lower power level to the remaining LEDs on the array.

In some embodiments, the device provides (1020) a distinct power level to each LED of the plurality of LEDs (e.g., with power supply sub-module 249, FIG. 2). Thus, in some embodiments, the providing (1014) includes providing a distinct power level to each LED of the plurality of LEDs. For example, each LED 752 on flash array 750 in FIG. 8 is provided a distinct power level.

In some embodiments, the plurality of LEDs includes (1022) a two-dimensional (2-D) array of LEDs. In some embodiments, the 2-D array of LEDs forms a rectangle, as shown in FIG. 7A, while in other embodiments, the 2-D array forms another shape such as a rounded-rectangle, a cross, or an oval. In various embodiments, the array of LEDs forms or is situated on a concave or convex surface or other curved surface. In some embodiments, the flash illumination generated by the LEDs is shaped by one or more lenses. In some embodiments, the device further includes a lens covering the flash array, as shown in FIG. 7D, and the lens shapes illumination generated by the flash array.

In some embodiments, the plurality of LEDs includes (1024) two or more LEDs of distinct sizes. For example, FIG. 7A shows flash array 700 including flash elements (e.g., LEDs) of various sizes. In some embodiments, the plurality of LEDs includes two or more LEDs of distinct shapes. For example FIG. 7B shows flash array 710 including flash elements (e.g., LEDs) of various shapes.

In some embodiments: the device supplies (1026) power to only a subset of the flash array (e.g., with power supply sub-module 249, FIG. 2) that is positioned to concentrate the flash illumination on the area of interest in the scene. For example, the device in FIG. 9A supplies power to only flash element 714 in order to concentrate the flash illumination on area of interest 902. In some embodiments, power is supplied to the entire array and additional power is supplied to a subset of the array (e.g., for additional illumination).

The device captures (1028), via a camera (e.g., camera 102, FIG. 1B), an image of the scene as illuminated by the flash illumination. For example, the device in FIG. 9A captures scene 300 as illuminated by flash array 710. In some embodiments, the device captures the image with a camera (e.g., camera 102, FIG. 2) in conjunction with an imaging module (e.g., imaging module 234, FIG. 2). In some embodiments, the device captures video images of the scene as illuminated by flash illumination. For example, a device captures video images of a scene as illuminated by flash array 710 as illustrated in FIGS. 9A-9C.

In some embodiments, the device predicts (1030) subsequent movement of an object in the scene (e.g., with motion prediction module 250, FIG. 2). In accordance with some embodiments, the device capturing the scene in FIGS. 9A-9C predicts motion of area of interest 902, corresponding to movement of hand 302, from position 902-a (FIG. 9A) to position 902-b (FIG. 9B) to position 902-c (FIG. 9C).

In some embodiments, the device redirects (1032) flash illumination to the object (e.g., with flash module 248, FIG. 2) based on the predicted movement of the object. In the example of FIGS. 9A-9C, the device redirects flash illumination from position 902-a (FIG. 9A) to position 902-b (FIG. 9B) to position 902-c (FIG. 9C). In some embodiments, the device determines whether the predicted movement of the object causes the object to leave an illuminated capture area for the device (e.g., illuminated capture area 110, FIG. 1B). In some embodiments, the device forgoes redirecting the flash illumination to the object in accordance with a determination that the object has left the illuminated capture area for the device. In some embodiments, the device generates an error in accordance with a determination that the object has left the illuminated capture area (e.g., displays an error message to a user of the device).

In some embodiments, the device repeatedly varies (1034) the power supplied to the respective elements of the flash array (e.g., with power supply sub-module 249, FIG. 2) to track the predicted movement. In the example of FIGS. 9A-9C, the device redirects the flash illumination by varying the power levels supplied to particular flash elements of flash array 710.

In some embodiments, the device captures (1036) one or more additional images as the flash illumination is redirected while the object moves. For example, an image is captured corresponding to each of FIGS. 9A-9C as illuminated by flash array 710.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method comprising:
at a device comprising a camera, one or more processors, and memory storing one or more programs configured for execution by the one or more processors:
constructing a depth map of an area of interest in a scene according to one or more images captured while applying a structured light pattern to the area of interest, including:
applying multiple, iterative structured light patterns to the area of interest to obtain multiple respective depth maps, wherein:
the area of interest in the scene comprises an object;
applying the structured light pattern comprises applying one or more lines of the structured light pattern with a specified orientation across an edge of the object so that a subset of the one or more lines of the structured light pattern intersect the edge of the object from at least one side at a specified angle; and
the structured light pattern is rotated for each iteration until the lines of the structured light pattern are determined to be perpendicular to the edge of the object;
directing, by the device, flash illumination to the area of interest in the scene, the directing comprising adjusting power supplied to respective elements of a flash array;
capturing, via the camera, an image of the scene as illuminated by the flash illumination;
predicting, by the device, subsequent movement of the object;
redirecting, by the device, flash illumination to the object based on the predicted movement of the object; and
capturing, via the camera, one or more additional images as the flash illumination is redirected while the object moves.

2. The method of claim 1, wherein directing the flash illumination to the area of interest in the scene comprises supplying power to only a subset of the flash array, wherein the subset of the flash array is positioned to concentrate the flash illumination on the area of interest in the scene.

3. The method of claim 1, wherein the device further comprises the flash array.

4. The method of claim 1, wherein:
the flash array comprises a plurality of light-emitting diodes (LEDs); and the adjusting comprises providing distinct power levels to respective LEDs of the plurality of LEDs.

5. The method of claim 4, wherein the providing comprises providing a distinct power level to each LED of the plurality of LEDs.

6. The method of claim 4, wherein the plurality of LEDs comprises a two- dimensional array of LEDs.

7. The method of claim 4, wherein the plurality of LEDs comprises two or more LEDs of distinct sizes.

8. The method of claim 1, wherein redirecting the flash illumination comprises repeatedly varying the power supplied to the respective elements of the flash array to track the predicted movement.

9. The method of claim 1, wherein the structured light pattern is generated so that one or more of the lines are perpendicular to the edge of the object.

10. A device comprising:
a flash array comprising a plurality of light sources; and
a controller configured to:
construct a depth map of an area of interest in a scene according to one or more images captured while applying a structured light pattern to the area of interest, including:
applying multiple, iterative structured light patterns to the area of interest to obtain multiple respective depth maps, wherein:
the area of interest in the scene comprises an object;
applying the structured light pattern comprises applying one or more lines of the structured light pattern with a specified orientation across an edge of the object so that a subset of the one or more lines of the structured light pattern intersect the edge of the object from at least one side at a specified angle; and
the structured light pattern is rotated for each iteration until the lines of the structured light pattern are determined to be perpendicular to the edge of the object; and
adjust power supplied to respective light sources of the plurality of light sources, to direct flash illumination for a camera to the area of interest in the scene, wherein the controller is configured to predict subsequent movement of the object and redirect flash illumination to the object based on the predicted movement of the object.

11. The device of claim 10, wherein the flash array is disposed in the camera.

12. The device of claim 10, wherein:
the plurality of light sources comprises a plurality of LEDs; and
the adjusting comprises providing distinct power levels to respective LEDs of the plurality of LEDs.

13. The device of claim 10, wherein redirecting the flash illumination comprises repeatedly varying the power supplied to the respective light sources to track the predicted movement.

14. The device of claim 10, wherein the structured light pattern is generated so that one or more of the lines are perpendicular to the edge of the object.

15. A non-transitory computer-readable storage medium storing one or more programs for execution by one or more processors, the one or more programs comprising instructions for:
constructing a depth map of an area of interest in a scene according to one or more images captured while applying a structured light pattern to the area of interest, including:
applying multiple, iterative structured light patterns to the area of interest to obtain multiple respective depth maps, wherein:
the area of interest in the scene comprises an object;
applying the structured light pattern comprises applying one or more lines of the structured light pattern with a specified orientation across an edge of the object so that a subset of the one or more lines of the structured light pattern intersect the edge of the object from at least one side at a specified angle; and
the structured light pattern is rotated for each iteration until the lines of the structured light pattern are determined to be perpendicular to the edge of the object;
directing flash illumination to the area of interest in the scene, the directing comprising adjusting power supplied to respective elements of a flash array;
capturing an image of the scene as illuminated by the flash illumination;
predicting subsequent movement of the object;
redirecting flash illumination to the object based on the predicted movement of the object; and
capturing one or more additional images as the flash illumination is redirected while the object moves.

16. The non-transitory computer-readable storage medium of claim 15, wherein redirecting the flash illumination comprises repeatedly varying the power supplied to the respective elements of the flash array to track the predicted movement.

17. The non-transitory computer-readable storage medium of claim 15, wherein the structured light pattern is generated so that one or more of the lines are perpendicular to the edge of the object.

* * * * *